US011195292B2

(12) United States Patent
Tsunashima

(10) Patent No.: US 11,195,292 B2
(45) Date of Patent: Dec. 7, 2021

(54) INFORMATION PROCESSING APPARATUS AND METHOD, VEHICLE, AND INFORMATION PROCESSING SYSTEM

(71) Applicant: Sony Corporation, Tokyo (JP)

(72) Inventor: Nobuhiro Tsunashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/325,582

(22) PCT Filed: Aug. 10, 2017

(86) PCT No.: PCT/JP2017/029191
§ 371 (c)(1),
(2) Date: Feb. 14, 2019

(87) PCT Pub. No.: WO2018/037947
PCT Pub. Date: Mar. 1, 2018

(65) Prior Publication Data
US 2019/0180463 A1    Jun. 13, 2019

(30) Foreign Application Priority Data

Aug. 24, 2016 (JP) .............................. JP2016-163832

(51) Int. Cl.
*G06T 7/593* (2017.01)
*G06K 9/20* (2006.01)
(Continued)

(52) U.S. Cl.
CPC .......... *G06T 7/593* (2017.01); *G06K 9/00805* (2013.01); *G06K 9/209* (2013.01);
(Continued)

(58) Field of Classification Search
None
See application file for complete search history.

(56) References Cited

U.S. PATENT DOCUMENTS

| 2011/0211068 A1 | 9/2011 | Yokota |
| 2014/0232831 A1 | 8/2014 | Shi |

(Continued)

FOREIGN PATENT DOCUMENTS

| DE | 102012214720 A1 * | 1/2014 | ......... G06K 9/00805 |
| DE | 102012214720 A1 | 1/2014 | |

(Continued)

OTHER PUBLICATIONS

International Search Report and Written Opinion dated Sep. 28, 2017 in connection with International Application No. PCT/JP2017/029191.

(Continued)

*Primary Examiner* — Heather R Jones
(74) *Attorney, Agent, or Firm* — William R. McClellan

(57) ABSTRACT

An automobile-mounted imaging apparatus and a computer readable storage medium for detecting a distance to at least one object. The apparatus comprises circuitry configured to select at least two images from images captured by at least three cameras to use for detecting the distance to the at least one object based on at least one condition. Alternatively or additionally, the apparatus comprises circuitry configured to select two cameras of at least three cameras for detecting the distance to the at least one object based on at least one condition. Alternatively or additionally, the apparatus comprises circuitry configured to determine which of at least two cameras to use for detecting the distance to the at least one object based on at least one condition from at least three cameras capturing images.

17 Claims, 19 Drawing Sheets

(51) Int. Cl.
*G06K 9/00* (2006.01)
*H04N 5/247* (2006.01)
*H04N 13/239* (2018.01)

(52) U.S. Cl.
CPC ............ *G06T 7/596* (2017.01); *H04N 5/247*
(2013.01); *G06T 2207/10012* (2013.01); *G06T 2207/30252* (2013.01); *H04N 13/239*
(2018.05)

(56) References Cited

U.S. PATENT DOCUMENTS

| | | | |
|---|---|---|---|
| 2015/0077522 A1* | 3/2015 | Suzuki | G02B 3/0037 348/48 |
| 2015/0145956 A1 | 5/2015 | Hayakawa et al. | |
| 2015/0172633 A1* | 6/2015 | Nobori | G06T 7/596 348/36 |
| 2016/0188995 A1* | 6/2016 | Somanath | G06K 9/6201 382/203 |
| 2018/0012085 A1* | 1/2018 | Blayvas | G06K 9/00805 |

FOREIGN PATENT DOCUMENTS

| | | |
|---|---|---|
| DE | 102014206227 A1 | 10/2015 |
| EP | 2879114 A1 | 6/2015 |
| JP | 05-114099 A | 5/1993 |
| JP | 06-082509 A | 11/1994 |
| JP | H07-280561 A | 10/1995 |
| JP | 2003-098424 A | 4/2003 |
| JP | 2009071539 A | 4/2009 |
| JP | 2011151798 A | 8/2011 |
| JP | 2012-201178 A | 10/2012 |
| JP | 2017531258 A | 10/2017 |
| WO | WO 2015/149799 A1 | 10/2015 |
| WO | WO 2015/159791 A1 | 10/2015 |

OTHER PUBLICATIONS

Japanese Office Action dated Aug. 25, 2020 in connection with Japanese Application No. 2016-163832 and English translation thereof.
International Preliminary Report on Patentability dated Mar. 7, 2019 in connection with International Application No. PCT/JP2017/029191.

* cited by examiner

INFORMATION PROCESSING APPARATUS AND METHOD, VEHICLE, AND INFORMATION PROCESSING SYSTEM

CROSS-REFERENCE TO RELATED APPLICATIONS

The present application claims the benefit under 35 U.S.C. § 371 as a U.S. National Stage Entry of International Application No. PCT/JP2017/029191, filed in the Japanese Patent Office as a Receiving Office on Aug. 10, 2017, which claims priority to Japanese Patent Application Number JP2016-163832, filed in the Japanese Patent Office on Aug. 24, 2016, each of which applications is hereby incorporated by reference in its entirety.

TECHNICAL FIELD

The present technology relates to an information processing apparatus and method, a vehicle, and an information processing system, and in particular, relates to an information processing apparatus and method capable of suppressing a decrease in reliability of distance measurements, a vehicle, and an information processing system.

CROSS REFERENCE TO RELATED APPLICATIONS

This application claims the benefit of Japanese Priority Patent Application JP 2016-163832 filed on Aug. 24, 2016, the entire contents of which are incorporated herein by reference.

BACKGROUND ART

In the past, as a technology to measure the distance of an object in a three-dimensional space, a stereo-camera system that measures the distance on the principle of triangulation from video captured by a plurality of cameras has been known (see, for example, PTL 1).

When such a stereo-camera system is applied to a vehicle, if a detected distance by an optical distance-measuring sensor changes rapidly due to the influence of an attachment to the window glass, removing the attachment by driving a wiper and also causing the driver to recognize an error of the detected distance theretofore by switching on a display lamp if the detected distance by the distance-measuring sensor thereafter changes from the distance before the wiper is driven were proposed (see, for example, PTL 2). Also, evaluating wiping performance of the field of view of the camera by the wiper based on image processing can be considered (see, for example, PTL 3).

CITATION LIST

Patent Literature

PTL 1: JP 05-114099A
PTL 2: JP-UM 6-82509A
PTL 3: JP 2012-201178A

SUMMARY OF INVENTION

Technical Problem

According to these methods, however, there is a possibility that distance measurements may not be temporarily made while the camera is cleaned or the wiper is driven.

The present technology is proposed in view of the above circumstances and it is desirable to suppress a decrease in reliability of distance measurements.

Solution to Problem

An automobile-mounted imaging apparatus for detecting a distance to at least one object according to an embodiment of the present disclosure includes: circuitry configured to: select at least two images from images captured by at least three cameras to use for detecting the distance to the at least one object based on at least one condition.

In some embodiments, a first distance between the two cameras of the at least three cameras is equal to a second distance between either of the two cameras and a camera of the at least three cameras from which an image was not selected.

In some embodiments, the at least one condition comprises at least one obstruction in a view of at least one of the at least three cameras.

In some embodiments, the at least one obstruction comprises at least one of fog, dust, or mist.

In some embodiments, the at least one condition comprises wiping control information indicating that at least one wiper is interfering with at least one of the at least three cameras.

In some embodiments, the at least one condition comprises a status of a wiper that causes interference with at least one of the at least three cameras.

In some embodiments, the circuitry is configured to receive distance information corresponding to at least one of the at least three cameras.

In some embodiments, the circuitry is configured to, after selecting the at least two images from the images captured by the at least three cameras to use for detecting the distance, select distance information corresponding to cameras of which images were selected to be used for detecting the distance.

In some embodiments, the circuitry is configured to select the at least two images from the images captured by the at least three cameras to use for detecting the distance in real time.

In some embodiments, the circuitry is configured to receive information from each of the at least three cameras and select the at least two images from the images captured by the at least three cameras to use for detecting the distance further based on the received information.

Alternatively or additionally, at least one non-transitory computer readable storage medium has stored thereon instructions that, when executed by at least one processor, perform a method for detecting a distance to at least one object using an automobile-mounted imaging apparatus, the method comprising: determining which of at least two images captured by at least three cameras of the automobile-mounted imaging apparatus to use for detecting the distance to the at least one object based on at least one condition.

Alternatively or additionally, an automobile-mounted imaging apparatus for detecting a distance to at least one object comprises: circuitry configured to: select two cameras of at least three cameras for detecting the distance to the at least one object based on at least one condition.

In some embodiments, a first distance between the selected two cameras of the at least three cameras is equal to a second distance between either of the selected two cameras and an unselected camera of the at least three cameras.

In some embodiments, the at least one condition comprises at least one obstruction in a view of at least one of the at least three cameras.

In some embodiments, the at least one condition comprises wiping control information indicating that at least one wiper is interfering with at least one of the at least three cameras.

In some embodiments, the circuitry is configured to receive distance information corresponding to at least one of the at least three cameras.

In some embodiments, the circuitry is configured to, after selecting the two cameras of the at least three cameras for detecting the distance, determine distance information corresponding to cameras selected.

In some embodiments, the circuitry is configured to receive information from each of the at least three cameras and select the two cameras of the at least three cameras for detecting the distance further based on the received information.

An automobile-mounted imaging apparatus for detecting a distance to at least one object, the apparatus comprising: circuitry configured to: determine which of at least two cameras to use for detecting the distance to the at least one object based on at least one condition from at least three cameras capturing images.

An information processing system of an aspect of the present technology includes: an imaging apparatus that images a subject; and an information processing apparatus that performs information processing related to a captured image captured by the imaging apparatus, in which the imaging apparatus includes three or more imaging units and the information processing apparatus includes a selection unit that selects two imaging units that perform imaging to generate distance information from the three or more imaging units of the imaging apparatus; and a distance detection unit that detects a distance to an observation point on the basis of captured images by the two imaging units selected.

In an aspect of the present technology, two imaging units that capture images to generate distance information are selected from three imaging units or more constituting the image pickup units and the distance to the observation point is detected on the basis of captured images by the two selected imaging units.

Advantageous Effects of Invention

According to an embodiment of the present technology, information can be processed. Also, according to an embodiment of the present technology, a decrease in reliability of distance measurements can be suppressed.

DESCRIPTION OF EMBODIMENTS

Figure 1:
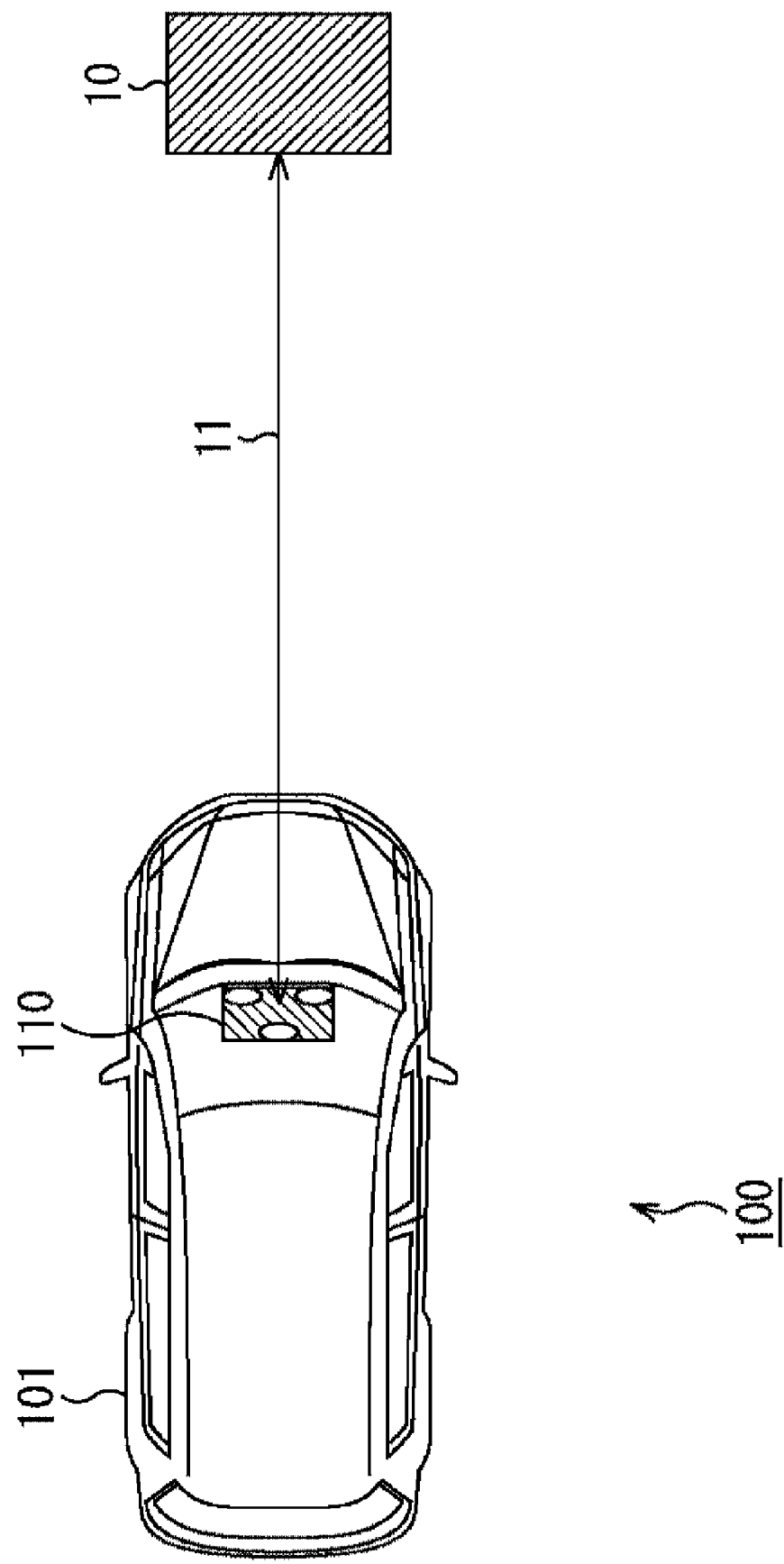
FIG. 1 is a diagram providing an overview of an imaging system.

Hereinafter, forms (hereinafter, embodiments) to carry out the present disclosure will be described. Incidentally, the description will be provided in the following order:
1. First embodiment (imaging system)
2. Second embodiment (imaging system)
3. Third embodiment (imaging system)
4. Fourth embodiment (application example)

1. First Embodiment

<Reliability of Distance Measurements>

In the past, a technology to measure the distance of an object inside a three-dimensional space was known to recognize an object in a three-dimensional space. For example, PTL 1 discloses, as a distance measuring system, a stereo-camera system that measures the distance on the principle of triangulation from video captured by a plurality of cameras.

Mounting such a stereo-camera system on a vehicle and using distance measurements thereof for automatic driving, remote control, drive assistance and the like can be considered. In such a case, the camera lens, the front-side window glass or the like becomes dirty while traveling and it is necessary to suitably secure the field of view of the camera by cleaning or wiping.

PTL 2 discloses a technology that, when a detected distance by an optical distance-measuring sensor changes rapidly due to the influence of an attachment to the window glass, removes the attachment by driving a wiper and also causes the driver to recognize an error of the detected distance theretofore by switching on a display lamp if the detected distance by the distance-measuring sensor thereafter changes from the distance before the wiper is driven. Also, PTL 3 discloses that suitability of the field of view of the camera is secured by evaluating wiping performance by the wiper of the field of view of the camera by image processing.

However, it is difficult for these methods to make distance measurements while the camera is cleaned or the wiper is driven. That is, in the meantime, there is the possibility that surroundings of the vehicle may not be monitored. To improve accuracy of automatic driving, remote control, drive assistance and the like of a mobile unit like a vehicle, it is necessary to obtain the latest information of the surroundings in real time. If reliability of distance measurements decreases as described above, there is the possibility that accuracy of automatic driving, remote control, drive assistance and the like may decrease.

Thus, two imaging units that capture images to generate distance information are selected from three imaging units or more constituting an image pickup unit and the distance to an observation point is detected on the basis of captured images by the two selected imaging units. Also, the distance to an observation point may be detected by selecting one or more stereo images from a plurality of stereo images, each of which including two captured images of the observation point captured from mutually different positions and using the distance to the observation point detected by using the stereo image(s) and corresponding to the selected stereo image(s).

In this manner, even if, for example, one camera is not available due to dirt or the like for distance measurements, distance measurements can be continued with stereo images obtained by using other cameras and therefore, a decrease in reliability of distance measurements can be suppressed.

<Overview of the Imaging System>

FIG. 1 is a diagram providing an overview of an imaging system as an embodiment of an information processing system to which the present technology is applied. An imaging system 100 shown in FIG. 1 is a system that generates a stereo image by imaging a subject using a plurality of cameras to perform processing using the stereo image such as making distance measurements up to the subject. The stereo image includes a pair of captured images capturing the subject from mutually different positions. That is, the stereo image has a parallax between the two captured images and, for example, the parallax can be used for distance measurements up to the subject appearing the captured images.

The imaging system 100 has an imaging apparatus 110 capable of obtaining a plurality of captured images to generate such a stereo image. In the imaging system 100, the imaging apparatus 110 is an image pickup unit including a plurality of imaging units and is set up in a vehicle 101. For example, as shown in FIG. 1, the imaging apparatus 110 is set up inside the vehicle 101 in such a way that a subject 10 in front of the vehicle 101 can be captured by each imaging unit. That is, the imaging apparatus 110 can obtain a plurality of captured images having a parallax to each other by capturing the subject 10 from mutually different positions. The imaging system 100 can measure the distance to the subject 10 by using captured images captured by the imaging apparatus 110.

<Imaging System Configuration>

Figure 2:
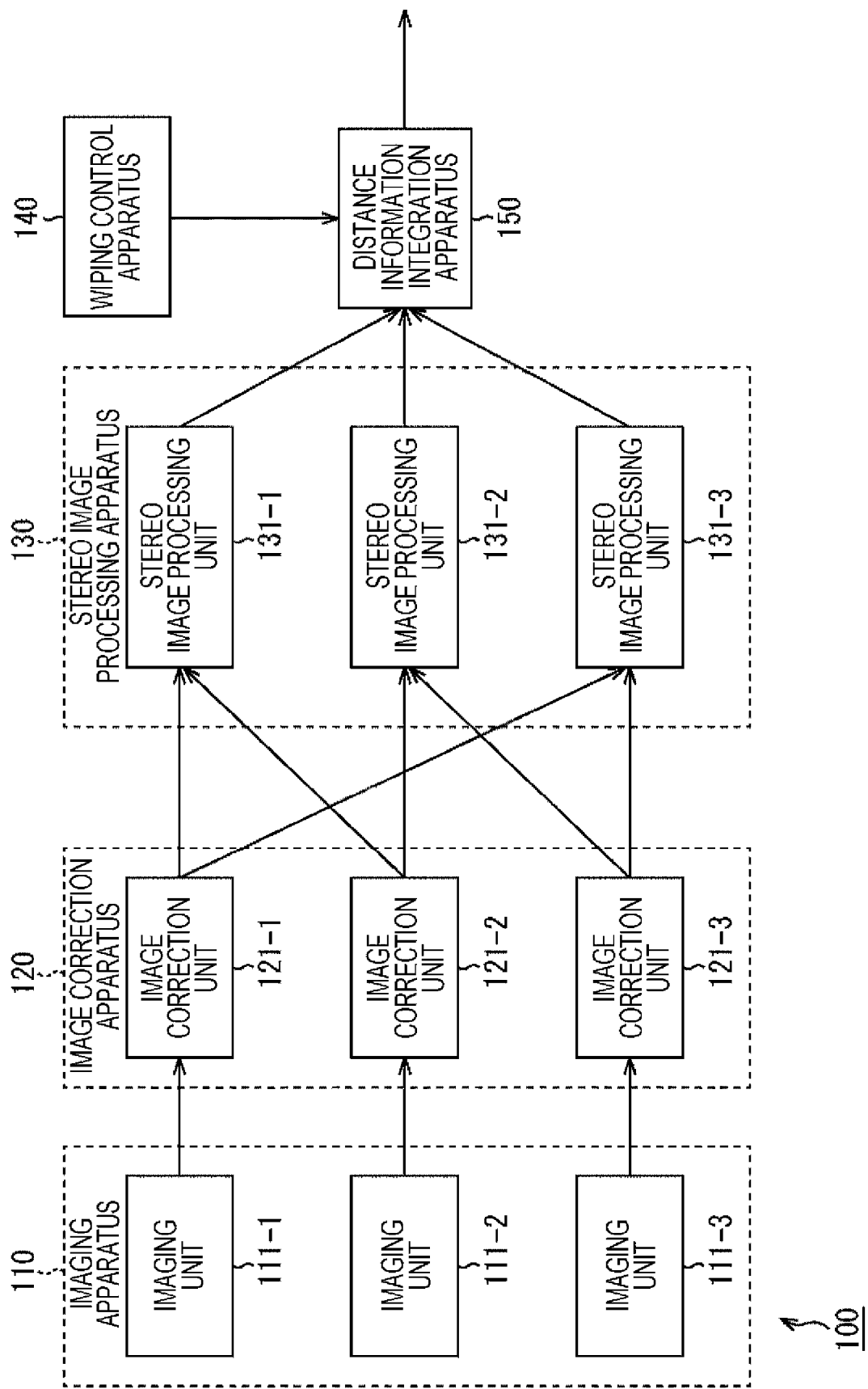
FIG. 2 is a block diagram showing a main configuration example of the imaging system.

FIG. 2 is a block diagram showing a main configuration example of the imaging system 100. As shown in FIG. 2, the imaging system 100 includes, in addition to the imaging apparatus 110, an image correction apparatus 120, a stereo image processing apparatus 130, a wiping control apparatus 140, and a distance information integration apparatus 150.

The imaging apparatus 110 is an image pickup unit including three imaging units or more and an apparatus that performs processing related to imaging of the subject using these imaging units. For example, as shown in FIG. 2, the imaging apparatus 110 includes imaging units 111-1 to 111-3. When there is no need to describe by distinguishing the imaging units 111-1 to 111-3, these imaging units 111-1 to 111-3 will be called imaging units 111. The imaging unit 111 is an embodiment of an imaging unit to which the present technology is applied and a processing unit that performs processing related to imaging of a subject by including an optical system such as a lens and a diaphragm, and an image sensor. For example, the imaging unit 111 captures a subject to obtain a captured image of a desired observation point. Each of the imaging units 111 can operate independently and capture an image simultaneously with the other imaging units 111 or at a different timing from the other imaging units 111. That is, the three imaging units 111-1 to 111-3 can all capture images simultaneously, two of these imaging units can capture images simultaneously, or only one of these imaging units can capture an image. That is, maximally three captured images can be obtained.

The image correction apparatus 120 is an embodiment of an image correction unit to which the present technology is applied and an apparatus that performs processing related to corrections of a captured image obtained by the imaging apparatus 110. The image correction apparatus 120 includes image correction units 121-1 to 121-3. When there is no need to describe by distinguishing the image correction units 121-1 to 121-3, these image correction units 121-1 to 121-3 will be called image correction units 121. The image correction unit 121 is a processing unit that performs processing related to corrections of a captured image obtained by the imaging apparatus 110. The image correction unit 121-1 performs processing related to corrections of a captured image obtained by the imaging unit 111-1. The image correction unit 121-2 performs processing related to corrections of a captured image obtained by the imaging unit 111-2. The image correction unit 121-3 performs processing related to corrections of a captured image obtained by the imaging unit 111-3. For example, the image correction unit 121 corrects aberrations of a captured image obtained by the imaging apparatus 110.

The stereo image processing apparatus 130 is an apparatus that performs processing related to a stereo image. The stereo image processing apparatus 130 is an embodiment of a stereo image processing unit to which the present technology is applied and, for example, sets a stereo image by combining two captured images and detects for each of the set stereo images the distance to an observation point on the basis of the stereo image.

The stereo image processing apparatus 130 includes stereo image processing units 131-1 to 131-3. When there is no need to describe by distinguishing the stereo image processing units 131-1 to 131-3, these stereo image processing units 131-1 to 131-3 will be called stereo image processing units 131. The stereo image processing unit 131 is a processing unit that performs processing related to a stereo image. For example, the stereo image processing unit 131 performs processing using the set stereo image such as setting a stereo image, detecting corresponding points of two captured images, or detecting the distance to an observation point.

For example, the stereo image processing unit 131-1 sets a stereo image by selecting a captured image corrected by the image correction unit 121-1 (a captured image obtained by the imaging unit 111-1) and a captured image corrected by the image correction unit 121-2 (a captured image obtained by the imaging unit 111-2) to set a stereo image and detects corresponding points of the selected captured images and measures the distance to a desired observation point. Also, the stereo image processing unit 131-2 sets a stereo image by selecting a captured image corrected by the image correction unit 121-2 (a captured image obtained by the imaging unit 111-2) and a captured image corrected by the image correction unit 121-3 (a captured image obtained by the imaging unit 111-3) to set a stereo image and detects corresponding points of the selected captured images and measures the distance to a desired observation point. Also, the stereo image processing unit 131-3 sets a stereo image by selecting a captured image corrected by the image correction unit 121-1 (a captured image obtained by the imaging unit 111-1) and a captured image corrected by the image correction unit 121-3 (a captured image obtained by the imaging unit 111-3) to set a stereo image and detects corresponding points of the selected captured images and measures the distance to a desired observation point.

The wiping control apparatus 140 is an apparatus that controls the operation of a wiping apparatus, for example, a wiper as it is called. The wiping apparatus (not shown) is an apparatus provided for each of the imaging units 111 to wipe out dirt, water droplets and the like attached to the optical system (such as a lens) of each of the imaging units 111. The wiping control apparatus 140 controls the operation of each wiping apparatus by supplying wiping control information that controls such a wiping apparatus to the wiping apparatus of each of the imaging units 111. The wiping apparatus of each of the imaging units 111 can operate independently. The wiping control apparatus 140 supplies desired wiping control information to a desired wiping apparatus on the basis of arbitrary information. If, for example, a sensor to monitor the optical system of each of the imaging units 111 for attachments (things that hinder imaging such as dirt, water droplets and the like) is provided and the sensor determines that an attachment has arisen, the wiping control apparatus 140 may supply wiping control information to the wiping apparatus of the imaging unit 111 to drive the wiping apparatus (to have the attachment wiped out). Also, the wiping control apparatus 140 may supply wiping control information to each wiping apparatus at regular or irregular intervals to drive the wiping apparatus (to have the attachment wiped out).

The wiping control apparatus 140 supplies the wiping control information also to the distance information integration apparatus 150.

The distance information integration apparatus 150 is an apparatus that performs processing related to integration of distance information to the observation point obtained by the stereo image processing apparatus 130. The distance information integration apparatus 150 integrates distance information to the observation point obtained from each stereo image set by the stereo image processing apparatus 130 to obtain one piece of distance information. This one piece of distance information is set as the distance information to the observation point obtained by the imaging system 100.

<Imaging Unit>

Figure 3:
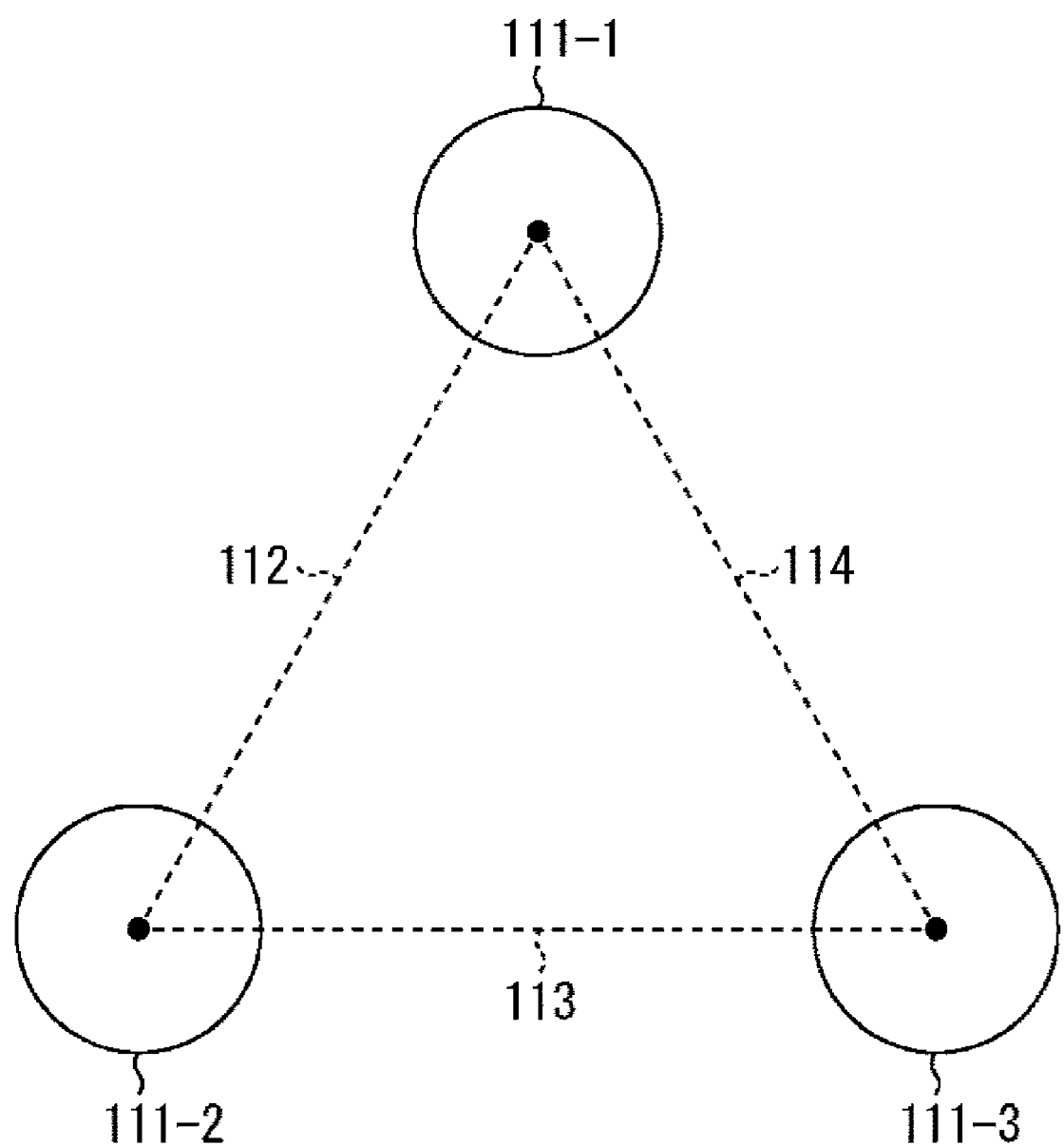
FIG. 3 is a diagram showing an arrangement example of imaging units.

FIG. 3 is a diagram illustrating an arrangement example of imaging units 111. In the imaging apparatus 110, the position where each of the imaging units 111 is arranged is arbitrary, but the relative physical relationship (physical relations to each other and the orientation of each) thereof is known. In FIG. 3, the imaging units 111-1 to 111-3 are each shown in a circular shape so as to indicate the shape when the optical system (lens) thereof is viewed from the front (subject side). In this case, these imaging units 111 are arranged in relative positions such that the center of the respective optical system (lens) is each vertex of an equilateral triangle. That is, each of the imaging units 111 is arranged such that the distance between the center of the optical system of the imaging unit 111-1 and the center of the optical system of the imaging unit 111-2 (length of a line segment 112), the distance between the center of the optical system of the imaging unit 111-2 and the center of the optical system of the imaging unit 111-3 (length of a line segment 113), and the distance between the center of the optical system of the imaging unit 111-3 and the center of the optical system of the imaging unit 111-1 (length of a line segment 114) are mutually an equal distance (the same length). Incidentally, each of the imaging units 111 is assumed to be oriented in the same direction.

As described above, a stereo image includes two captured images. That is, a stereo image is generated by selecting captured images generated by any combination of the two imaging units 111 of the three imaging units 111. With the distances between each of the imaging units 111 (lengths of the line segment 112 to the line segment 114) being set equal like the example in FIG. 3, the parallax is the same when any combination of the two imaging units 111 is selected and thus, there is no need to calibrate the parallax in distance adjustments using a stereo image. In other words, no matter which combination of the two imaging units 111 is selected, the imaging system 100 can have mutually the same distance measurement performance.

<Stereo Image Processing Unit>

Figure 4:
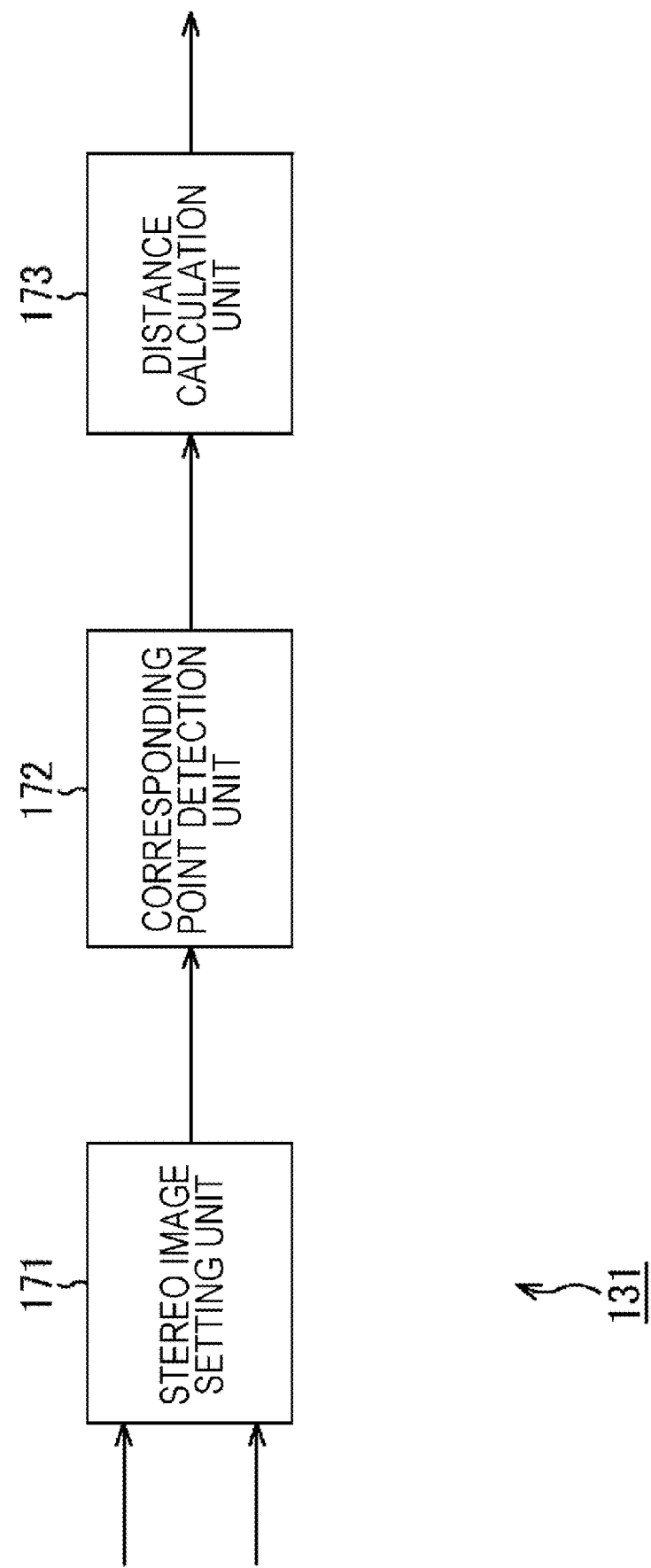
FIG. 4 is a block diagram showing a main configuration example of a stereo image processing apparatus.

FIG. 4 is a block diagram showing a main configuration example of the stereo image processing units 131. The stereo image processing unit 131 includes, for example, as shown in FIG. 4, a stereo image setting unit 171, a corresponding point detection unit 172, and a distance calculation unit 173. The stereo image setting unit 171 performs processing related to settings of a stereo image. For example, the stereo image setting unit 171 selects two desired captured images from captured images obtained in the imaging apparatus 110 and sets the selected two captured images as a set of stereo image.

The corresponding point detection unit 172 performs processing related to detection of corresponding points of a stereo image. For example, the corresponding point detection unit 172 detects corresponding points of each captured image regarding a stereo image set by the stereo image setting unit 171. Corresponding points are pixels where mutually the same subject appears in two captured images. In general, two captured images of a stereo image are captured from mutually different positions and thus, contents of both of captured images are not completely the same because the same subject appears in pixels of positions shifted from each other. Corresponding points are intended to indicate such a physical relationship of the subject between captured images and are information to indicate to which pixel of each captured image the same subject corresponds (is mapped). The corresponding point detection unit 172 detects pixels in which the same subject appears in each captured image and sets such pixels as corresponding points.

The method of detecting corresponding points may be any method. For example, the corresponding point detection unit 172 may, after setting one of two captured images of a stereo image as a benchmark image and the other as a reference image, search for the position in the reference image corresponding to a certain point in the benchmark image. Also, the method of search may be any method. For example, block matching may be used. The block matching is a method of evaluating whether the current pixel and surrounding regions (blocks) are similar. Incidentally, the corresponding point detection unit 172 may all corresponding points contained in the stereo image or any portion of corresponding points (as representative points).

The distance calculation unit 173 performs processing related to the distance calculation to a desired observation point using a stereo image. For example, the distance calculation unit 173 uses a subject appearing in a corresponding point detected by the corresponding point detection unit 172 as an observation point to calculate the distance to the observation point. The distance calculation unit 173 may calculate distances to observation points for all corresponding points detected by the corresponding point detection unit 172 or distances to observation points for only a portion of corresponding points.

Figure 5:
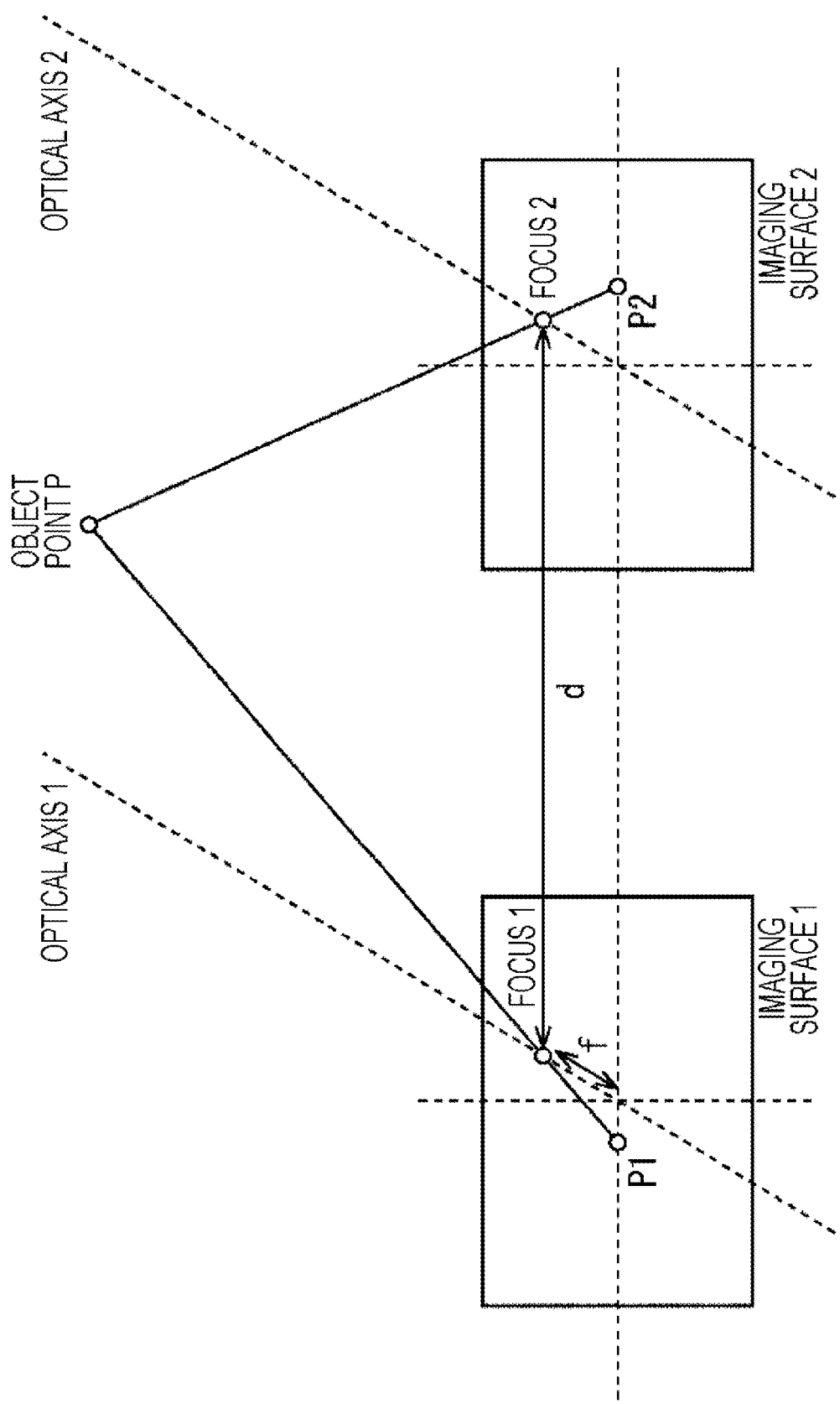
FIG. 5 is a diagram illustrating an example of a method of distance measurements.

The method of calculating the distance in this case may be any method. For example, the distance calculation unit 173 may detect the distance to a desired observation point on the basis of the relative physical relationship of the imaging units that obtain each captured image constituting a stereo image. As described above, the relative physical relationship of the imaging units is known. For example, as shown in FIG. 5, a certain object point P (X, Y, Z) is set as an observation point. It is also assumed that the object point P appears in a pixel P1 (x1, y1) of one captured image and in a pixel P2 (x, y2) of the other captured image. If the distance between the two captured images (the two imaging units 111) of the stereo image is d and the focal length of the lens of each of the imaging units 111 is f, a distance Z to the object can be determined by the following formula (1):

$$Z = d \cdot f / (x1 - x2) \quad (1)$$

Incidentally, (x1−x2) in the formula (1) shows a difference of positions of the pixel P1 and the pixel P2. That is, in the case of the formula (1), the Y coordinate of the pixel P1 and that of the pixel P2 match (y1=y2). If the Y coordinates of the pixel P1 and the pixel P2 are different, this portion is represented by also including a difference of the Y coordinates like, for example, $\sqrt{(x1-x2)^2 + (y1-y2)^2}$.

Also, the distance d between the imaging units 111 and the focal length f of the imaging unit 111 are fixed values determined by the system. That is, the distance to the object point P can be calculated from the formula (1) by determining the values of x1, x2 (that is, coordinates of the pixel P1 and the pixel P2). The pixel P1 and the pixel P2 are corresponding points where the observation point (object point P) appears. That is, the corresponding point detection unit 172 detects, as described above, the pixel P1 and the pixel P2 and thus, the distance calculation unit 173 can determine the distance Z to the object using, for example, the formula (1).

<Distance Information Integration Apparatus>

Figure 6:
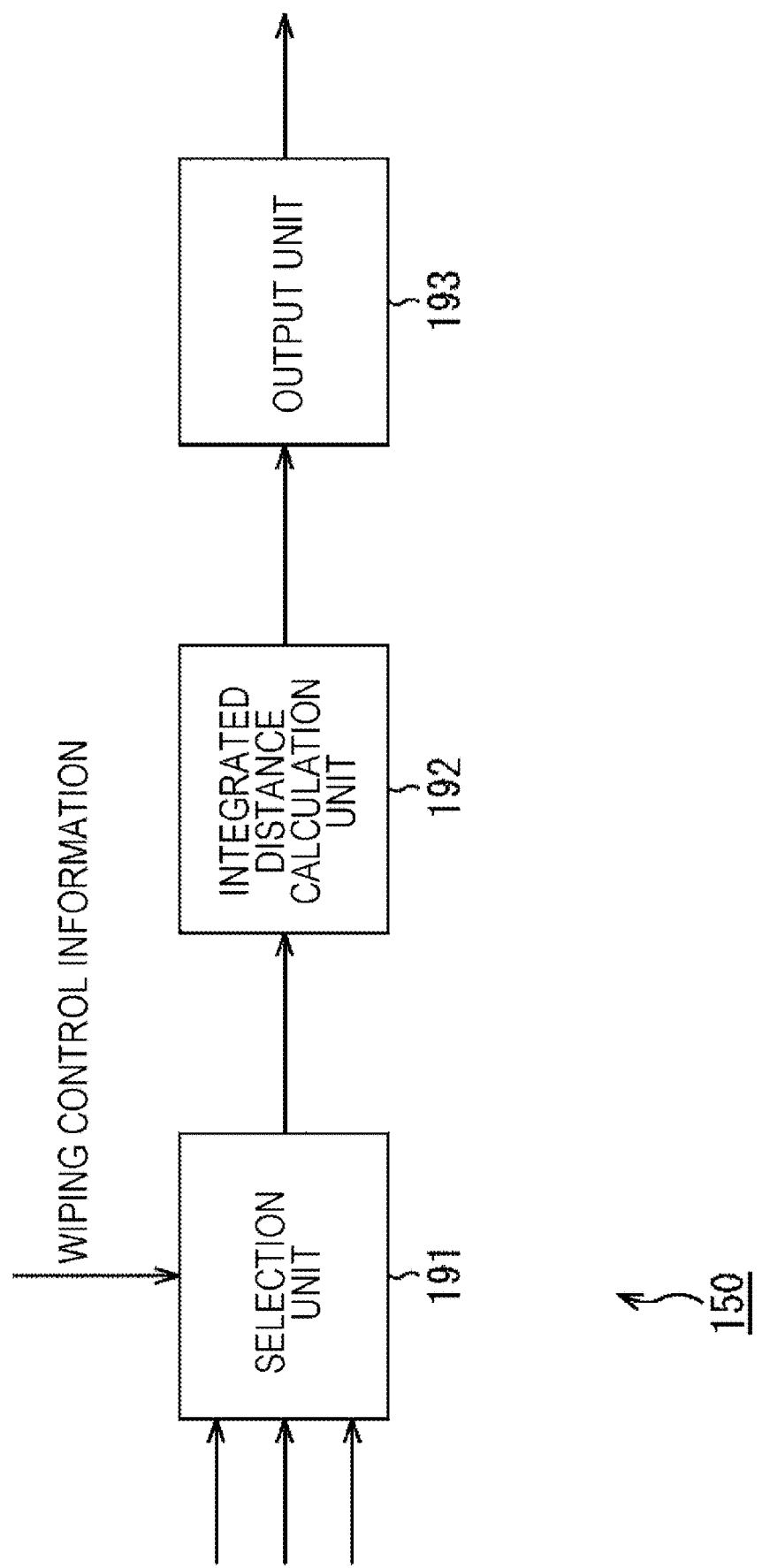
FIG. 6 is a block diagram showing a main configuration example of a distance information integration apparatus.

FIG. 6 is a block diagram showing a main configuration example of the distance information integration apparatus 150 (FIG. 2). As shown in FIG. 6, the distance information integration apparatus 150 includes, for example, a selection unit 191, an integrated distance calculation unit 192, and an output unit 193.

The selection unit 191 is an embodiment of a selection unit to which the present technology is applied. The selection unit 191 performs processing to select two imaging units that capture images to generate distance information from three imaging units or more constituting the image pickup unit. Incidentally, the selection unit 191 may also perform processing to select one stereo image or more from a plurality of stereo images, each of which including two captured images of an observation point captured from mutually different positions.

For example, the selection unit 191 acquires distance information generated by the stereo image processing apparatus 130 (the distance calculation unit 173 of each of the stereo image processing units 131). The distance information is information indicating the distance to a common subject (observation point) and distance information calculated individually on the basis of each stereo image. Therefore, selecting distance information by the selection unit 191 and selecting a stereo image are equivalent. That is, the selection unit 191 may be said to select one stereo image or more from a plurality of stereo images set by the stereo image processing apparatus 130. Additionally, a stereo image is formed of captured images obtained by the two imaging units 111 of the imaging apparatus 110. Therefore, selecting a stereo image by the selection unit 191 and selecting the imaging units 111 are equivalent. That is, selecting distance information by the selection unit 191 and selecting the imaging units 111 are equivalent. Therefore, the selection unit 191 may be said to select the two imaging units 111 that capture images to generate distance information from the three imaging units 111 or more constituting the imaging apparatus 110 (image pickup unit).

In the case of FIG. 6, for example, the selection unit 191 acquires distance information from each of the three stereo image processing units 131. Also, the selection unit 191 acquires wiping control information supplied from the wiping control apparatus 140 (FIG. 2). On the basis of the wiping control information, the selection unit 191 selects distance information to be adopted.

Figure 7:
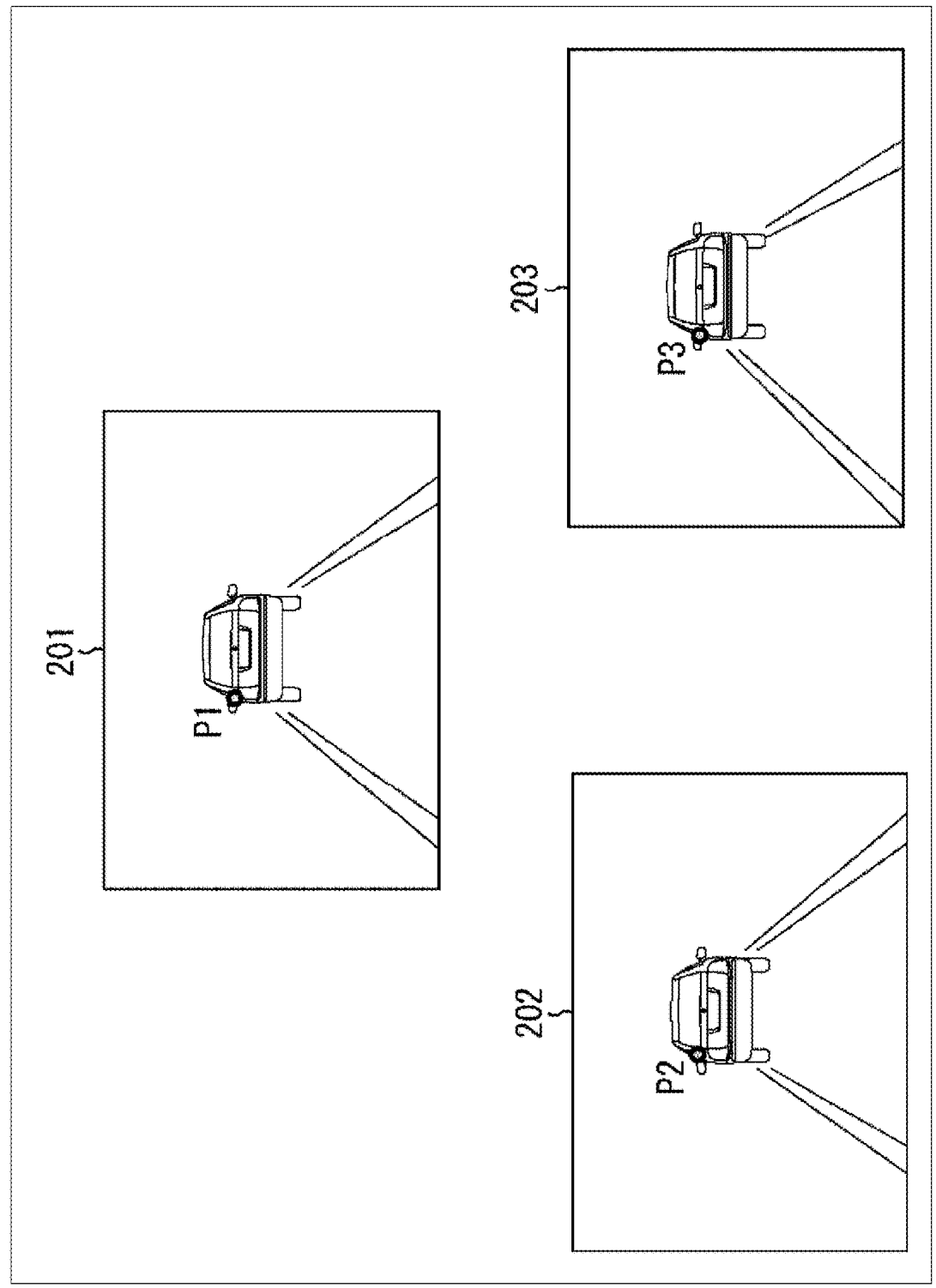
FIG. 7 is a diagram illustrating an example of how distance measurements are operated.

It is assumed that, for example, captured images 201 to 203 shown in FIG. 7 are obtained by the imaging units 111-1 to 111-3. In this case, none of the wiping apparatus in the imaging units 111 operates and none of the wiping apparatus appears in the captured images. Thus, a pixel P1 in the captured image 201, a pixel P2 in the captured image 202, and a pixel P3 in the captured image 203 correspond to the same position of the vehicle in front. In this case, therefore, the stereo image processing apparatus 130 can determine the distance to the above position (observation point) of the vehicle in front with sufficient precision from any of a stereo image including the captured image 201 and the captured image 202, a stereo image including the captured image 202 and the captured image 203, and a stereo image including the captured image 203 and the captured image 201. Thus, in this case, the selection unit 191 selects and supplies all distance information detected on the basis of each stereo image to the integrated distance calculation unit 192. In this case, the selection unit 191 may be said to select all stereo images or to select all the imaging units 111.

Figure 8:
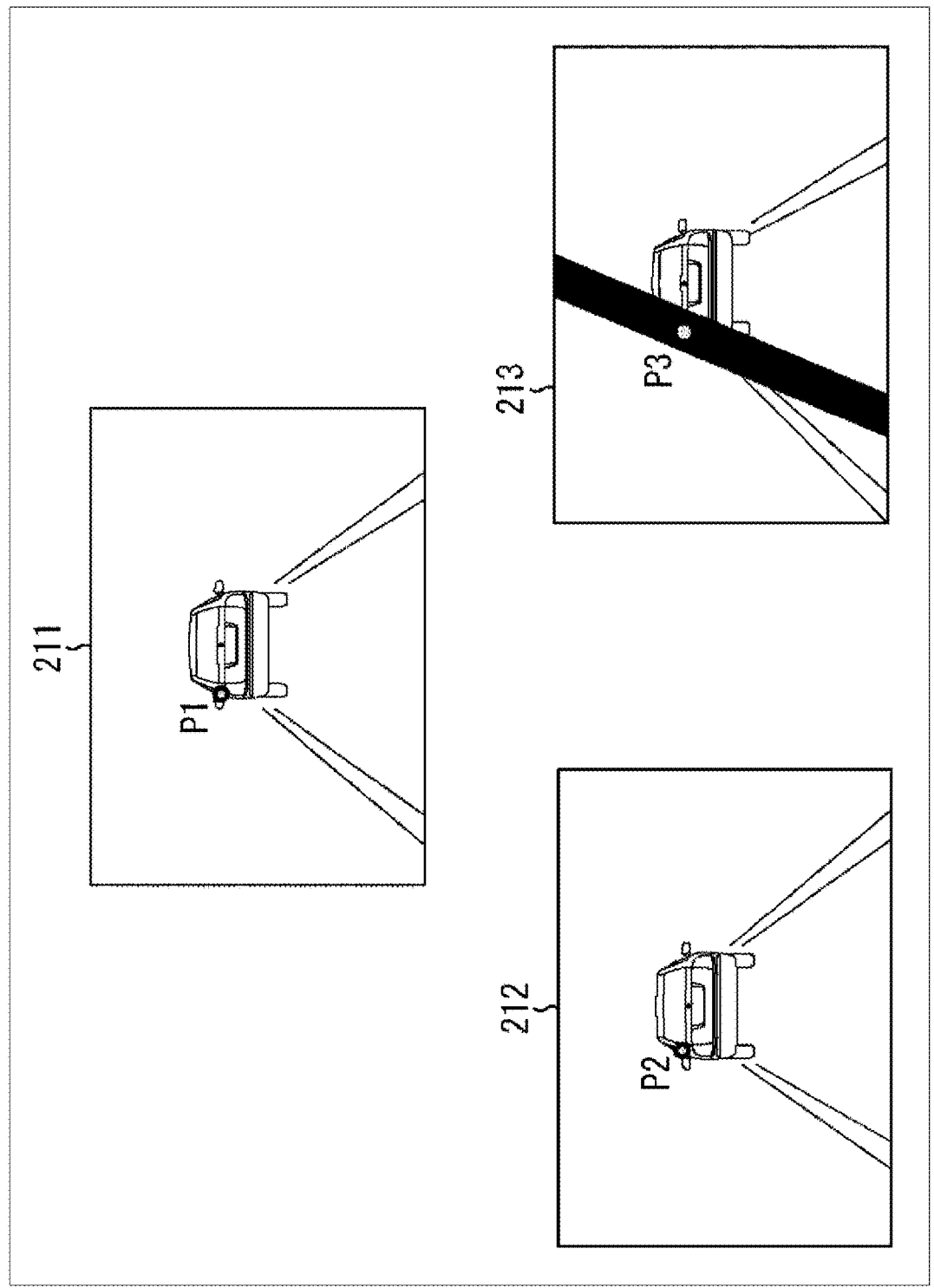
FIG. 8 is a diagram illustrating an example of how distance measurements are operated.

In contrast, it is assumed that, for example, captured images 211 to 213 shown in FIG. 8 are obtained by the imaging units 111-1 to 111-3. In this case, the wiping apparatus of the imaging unit 111-3 is driven and the wiping apparatus appears in the pixel P3 of the captured image 213. Thus, it is difficult to determine the distance to the observation point with sufficient precision using the captured image 213 like the example in FIG. 7. In this case, therefore, the selection unit 191 selects and supplies distance information detected on the basis of a stereo image including the captured image 211 and the captured image 212 to the integrated distance calculation unit 192. In this case, the selection unit 191 may be said to select a stereo image including the captured image 211 and the captured image 212 or to select the imaging unit 111-1 and the imaging unit 111-2 (two imaging units).

The integrated distance calculation unit 192 is an embodiment of a distance detection unit to which the present technology is applied. The integrated distance calculation unit 192 detects the distance to an observation point. For example, the integrated distance calculation unit 192 detects the distance to an observation point on the basis of distance information (distance to an observation point) selected by the selection unit 191. That is, the integrated distance calculation unit 192 may be said to detect the distance to an observation point on the basis of distance information (distance to an observation point) detected by using the selected stereo image or to detect the distance to an observation point on the basis of captured images by the selected two imaging units 111.

If, for example, a plurality of pieces of distance information (a plurality of stereo images or a plurality of pairs of the imaging units 111) is selected, the integrated distance calculation unit 192 detects the distance to an observation point by integrating each selected piece of distance information (distance information corresponding to each selected stereo image or distance information corresponding to the selected pair of the imaging units 111). The distance to an observation point detected by the integrated distance calculation unit 192 is also called an integrated distance. For example, in the case of FIG. 7, three pieces of distance information as described above is obtained. Therefore, the integrated distance calculation unit 192 determines the integrated distance using the three pieces of distance information. That is, in this case, the integrated distance calculation unit 192 integrates each selected piece of distance information to determine the distance to an observation point detected by the integrated distance calculation unit. The method of calculating the integrated distance may be any method. For example, the integrated distance calculation unit 192 may be determined as the average value of the three pieces of distance information as the integrated distance.

In addition, if, for example, a single piece of distance information (a single stereo image or the two imaging units 111) is selected, the integrated distance calculation unit 192 integrates the selected distance information (distance information corresponding to the selected stereo image or distance information corresponding to the selected two imaging units 111) to detect the distance (integrated distance) to an observation point. For example, in the case of FIG. 8, one distance information can be obtained as described above. Therefore, the integrated distance calculation unit 192 sets this one piece of distance information as the integrated distance. That is, in this case, the integrated distance calculation unit 192 sets the selected single piece of distance information as the distance to an observation point detected by the integrated distance calculation unit.

The output unit 193 is an embodiment of an output unit to which the present technology is applied and outputs information (also called integrated distance information) indicating the distance to an observation point detected by the integrated distance calculation unit 192 to the outside of the imaging system 100.

As described above, the selection unit 191 selects the two imaging units that capture images to generate distance information from the three imaging units or more (selects one piece of information or more from a plurality pieces of distance information (a plurality of stereo images)) and the integrated distance calculation unit 192 detects the distance to an observation point on the basis of captured images by the selected two imaging units (generates integrated distance information using the selected distance information (distance information determined from the selected stereo image)). Therefore, even if, for example, the wiping apparatus is operating, the selection unit 191 can select available distance information (stereo image) and the integrated distance calculation unit 192 can generate integrated distance information. That is, the distance information integration apparatus 150 can suppress an occurrence of circumstances in which distance measurements may not be made so that a decrease in reliability of distance measurements can be suppressed.

Incidentally, the selection unit 191 selects distance information (a stereo image or the imaging units 111) using wiping control information. Accordingly, the selection unit 191 can easily grasp the operating state of the wiping apparatus and so can easily identify the imaging unit 111 whose captured image is affected by the wiping apparatus (stereo image affected by the wiping apparatus). Therefore, the selection unit 191 can easily select distance information (a stereo image or the imaging units).

Also, if a plurality of pieces of distance information is selected by the selection unit 191, the integrated distance calculation unit 192 generates integrated distance information using the plurality of pieces of distance information. In this manner, more correct distance measurements can be implemented. Incidentally, by each of the imaging units 111 being arranged in the shape of an equilateral triangle like the example shown in FIG. 3, there is a plurality directions in which the two imaging units 111 is arranged (directions of parallax between captured images constituting a stereo image). For example, in the example of FIG. 3, the direction of parallax of each stereo image (orientation of the line segments 112 to 114) is different from each other. Thus, when the integrated distance calculation unit 192 generates integrated distance information using a plurality of pieces of distance information, integrated distance information is generated by using the parallax in a plurality of directions and thus, an integrated distance can be determined more correctly. If, for example, a stereo image contains a pattern in which the edge direction is not balanced like a striped pattern, distance measurements may not be made depending on the direction of parallax. By generating integrated distance information using a plurality of directions of parallax as described above, distance information can be generated by using the parallax in which the precision does not decrease and therefore, resistance to such an unbalanced edge direction can be increased and more correct distance measurements than when integration information is generated by using the parallax in a single direction can be made.

Also, by making the distance between the imaging units 111 equidistant like the example shown in FIG. 3, the precision of distance measurements can be made the same without calibration for all stereo images. Therefore, changes of the precision of distance measurements depending on the selected stereo image can be suppressed and so more correct distance measurements can be implemented more easily.

<Flow of Distance Measurement Processing>

Next, the flow of processing performed by the imaging system 100 will be described. An example of the flow of distance measurement processing performed by the imaging system 100 will be described with reference to the flowchart of FIG. 9.

When the distance measurement processing is started, in step S101, each of the imaging units 111 of the imaging apparatus 110 images a subject to obtain a captured image. In step S102, the image correction unit 121 of the image correction apparatus 120 corrects the captured image obtained in step S101. In step S103, the stereo image setting unit 171 of each of the stereo image processing units 131 of the stereo image processing apparatus 130 selects and sets a set of two desired captured images from captured images corrected in step S102 as a stereo image.

In step S104, the corresponding point detection unit 172 detects corresponding points between captured images for each stereo image set in step S103. In step S105, the distance calculation unit 173 calculates the distance to an observation point appearing in a corresponding point detected in step S104.

In step S106, the selection unit 191 detects motion of the wiping apparatus on the basis of wiping control information supplied from the wiping control apparatus 140. In step S107, the selection unit 191 selects distance information obtained from a stereo image in which the wiping apparatus does not appear. In step S108, the integrated distance calculation unit 192 calculates the integrated distance using the distance information selected in step S107.

In step S109, the output unit 193 outputs distance information indicating the integrated distance calculated in step S108. When the processing in step S109 terminates, the distance measurement processing terminates. By performing the distance measurement processing as described above, the imaging system 100 can suppress a decrease in reliability of distance measurements.

<Application Example>

Figure 10:
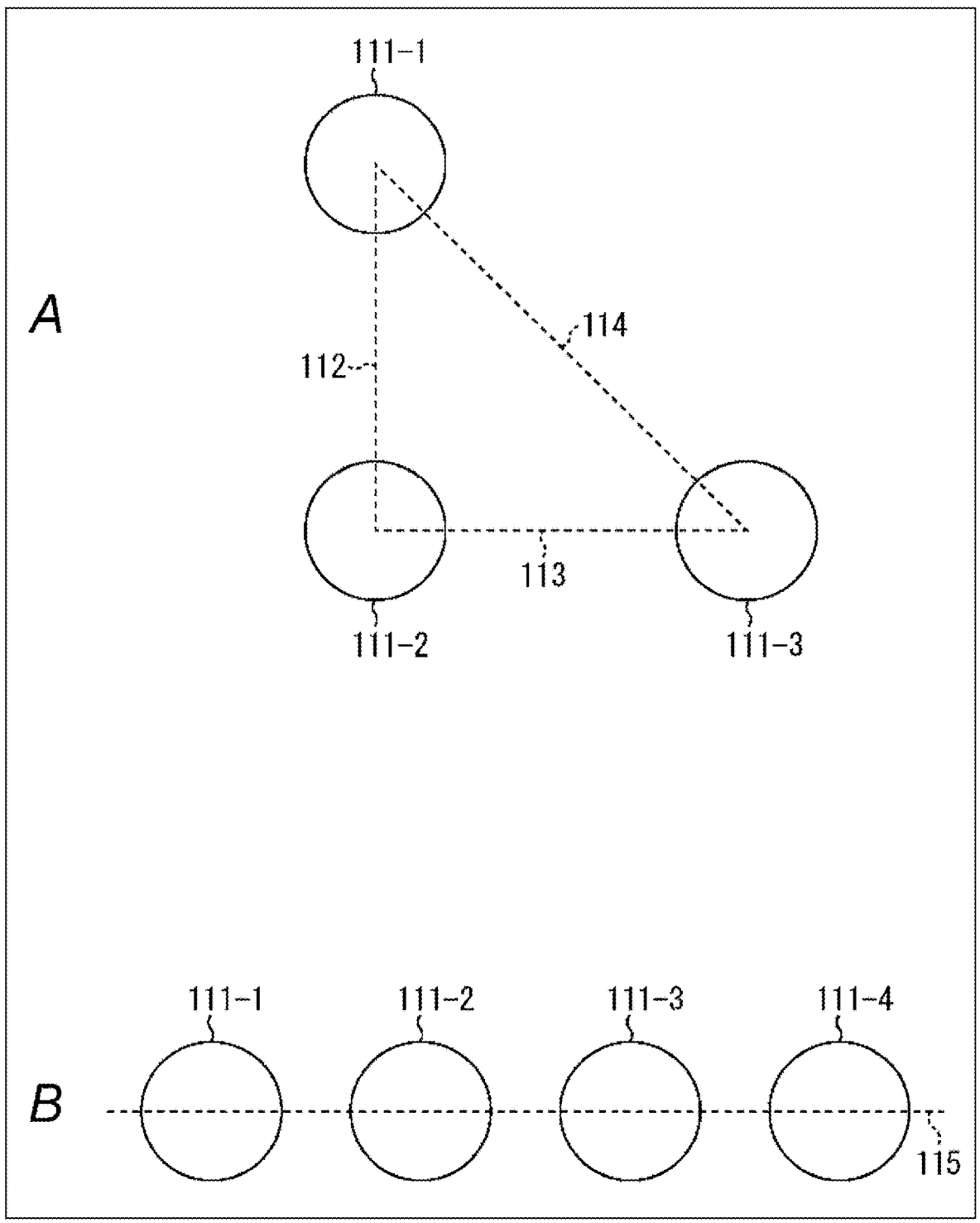
FIG. 10 is a diagram showing arrangement examples of imaging units.

Incidentally, in the foregoing, a description was provided like the imaging units 111 being arranged in the shape of an equilateral triangle, but the arrangement position (relative physical relationship) of the imaging unit 111 is arbitrary. For example, as shown in FIG. 10A, the imaging units 111-1 to 111-3 may be arranged in the shape of a right-angled triangle. If arranged in such a way, the direction (direction of parallax) of the line segment 112 and that of the line segment 113 are orthogonal to each other. In general, the precision of distance measurements using a stereo image tends to decrease when distance measurements to an observation point shifted in the direction of parallax thereof are made. If, for example, a stereo image is set by combining a captured image obtained by the imaging unit 111-2 in FIG. 10A and a captured image obtained by the imaging unit 111-3, the direction of parallax becomes the horizontal direction (direction of the line segment 113) in FIG. 10A. In this case, the precision of distance measurements to observation points positioned on the right of the imaging unit 111-3 in FIG. 10A and that of distance measurements to observation points positioned on the left of the imaging unit 111-2 are more likely to decrease than the precision of distance measurements to observation points whose horizontal position is between the imaging unit 111-2 and the imaging unit 111-3.

However, the direction of parallax (direction of the line segment 112) of a stereo image set by combining a captured image obtained by the imaging unit 111-1 and a captured image obtained by the imaging unit 111-2 becomes the vertical direction in FIG. 10A. That is, the position of the above observation point is shifted in a direction (horizontal direction in FIG. 10A) perpendicular to the direction of parallax (vertical direction in FIG. 10A) of the stereo image. Therefore, by using the stereo image, a decrease of the precision of distance measurements to an observation point can be suppressed.

Thus, by arranging each of the imaging units 111 in such a way that a plurality of directions can be set as directions of parallax of a stereo image, a decrease of the precision of distance measurements can be suppressed. Particularly, by enabling to set directions of parallax in directions orthogonal to each other like the example in FIG. 10A, a decrease of the precision of distance measurements can be suppressed still further.

Naturally, the imaging units 111-1 to 111-3 may be arranged in any triangular shape such as the shape of an isosceles triangle. If the distance between captured images of each stereo image is not unified like the case of an equilateral triangle (FIG. 3), calibration of parallax may be made doable to suppress changes of the precision of distance measurements depending on the selected stereo image.

Also, the number of the imaging units 111 constituting the imaging apparatus 110 (image pickup unit) and the number thereof may be, for example, four or more. In other words, the number of the imaging units 111 the imaging apparatus 110 needs to have is three or more. Then, the arrangement positions of the imaging units 111 may be a polygonal shape in accordance with the number of the imaging units 111 like a quadrangular shape, a pentagonal shape, a hexagonal shape or the like. The precision of distance measurements of each stereo image is basically similar to a case of a triangle, but in general, the occurrence of circumstances which makes it difficult to make distance measurements can be decreased with an increasing number of the imaging units 111 so that a decrease in reliability of distance measurements can be suppressed. However, an increase in cost can be suppressed with a decreasing number of the imaging units 111.

In addition, as shown in the example of FIG. 10B, all the imaging units 111 may be arranged on a straight line. In the case of FIG. 10B, imaging units 111-1 to 111-4 are arranged on a straight line 115. In this manner, the direction of parallax is unified (in the direction of the straight line 115) no matter which captured images are combined (for any stereo image). Therefore, utilization of a stereo image for other purposes than distance measurements can be facilitated like, for example, a stereoscopic display using a stereo image. If, for example, the imaging units 111 are arranged in a polygonal shape, the direction of parallax may change depending on the selected stereo image and thus, complicated processing like correcting the direction of parallax may be necessary for a stereoscopic display.

Incidentally, for distance measurements, all available stereo images may typically be used or a portion of stereo images may be used. In FIG. 10A, for example, the imaging units 111-2, 111-3 may normally be used for distance measurements and only when a captured image of one of the imaging units 111 is affected by the wiping apparatus, a captured image obtained by the imaging unit 111-1 may be used. In this manner, loads of imaging and distance measurements can be reduced and an increase of power consumption can be curbed. However, as described above, more correct distance measurements can generally be made by using an increasing number of stereo images (that is, an increasing number of the imaging units 111).

Also, the performance and specifications of each of the imaging units 111 of the imaging apparatus 110 may be unified or not unified. For example, when an image analysis of a captured image is conducted to make an obstacle determination, higher definition images than images of distance measurements are demanded. Thus, the image analysis and distance measurements may normally be made using the imaging unit 111 having a high resolution image sensor and when the imaging unit 111 is not available, distance measurements may be continued by using the imaging unit 111 having a low resolution and inexpensive image sensor. In this manner, an increase of the cost of the imaging unit 111 can be curbed.

Incidentally, the content of image correction processing performed by the image correction unit 121 is arbitrary and is not limited to the above example. Also, the number of the image correction units 121 is arbitrary. In the example of FIG. 2, the number of the image correction units 121 is made equal to the number of the imaging units 111, but the number of the image correction units 121 may be different from the number of the imaging units 111. For example, the one image correction unit 121 may perform image correction processing on captured images obtained by a plurality of the imaging units 111.

Also, the content of stereo image processing performed by the stereo image processing units 131 is arbitrary and is not limited to the above example. Also, the number of the stereo image processing units 131 is arbitrary. In the example of FIG. 2, the number of the stereo image processing units 131 is made equal to the number of the imaging units 111, but the number of the stereo image processing units 131 may be different from the number of the imaging units 111. For example, the one stereo image processing unit 131 may set a plurality of stereo images. Also, for example, the stereo image processing unit 131 may generate a stereo image of virtual viewpoint using an obtained captured image.

The method of detecting corresponding points by the corresponding point detection unit 172 may be any method and may be a method other than the block matching described above. Also, the corresponding point detection unit 172 may detect all corresponding points that can be detected from a stereo image or detect only a portion of corresponding points. Also, the method of calculating the distance to an observation point by the distance calculation unit 173 may be any method and is not limited to the above example. Also, the distance calculation unit 173 may calculate the distance to an observation point for all corresponding points detected by the corresponding point detection unit 172 or calculate the distance to an observation point for only a portion of corresponding points.

Incidentally, in the foregoing, a description was provided like the wiping apparatus being provided for all the imaging units 111, but the wiping apparatus may be provided for only a portion of the imaging units 111. Also, a description was provided like attachments of the optical system of each of the imaging units 111 being wiped out by the wiping apparatus, but the wiping apparatus may also wipe out attachments of others than the optical system of each of the imaging units 111. For example, the imaging apparatus 110 may be provided inside the vehicle in order to capture front images of the vehicle 101 via the front glass of the vehicle 101 so that the wiping apparatus wipes out attachments of the front glass. Also in this case, if the wiping apparatus operates and appears in a captured image of each of the imaging units 111, similarly to the case of FIG. 8, the wiping apparatus becomes a nuisance and a case in which it is difficult to make distance measurements to an observation point can be considered. In such a case, the selection unit 191 may identify a captured image in which the wiping apparatus appears on the basis of wiping control information so that other captured images than the identified captured image are selected. In this manner, like the case described above, the imaging system 100 can suppress a decrease in reliability of distance measurements.

Incidentally, in the foregoing, the wiping apparatus was taken as an example, but the selection unit 191 may select a stereo image on the basis of the operation of a configuration affecting a captured image. The configuration affecting a captured image is arbitrary and may be a wiping apparatus (wiper) like the above case or others. For example, the configuration may remove attachments by pouring water.

Furthermore, in the foregoing, a description was provided like all available distance information (stereo images) being selected, but the present embodiment is not limited to such an example and the selection unit 191 can select distance information (stereo image) by any method. For example, the selection unit 191 may select a predetermined number of pieces of distance information (stereo images) according to the predetermined order of priority from available distance information (stereo images). In this manner, the number of selected distance information (stereo images) becomes constant, which facilitates subsequent processing such as the calculation of an integrated distance.

Incidentally, the method of calculating an integrated distance is arbitrary. When a plurality of pieces of distance information (stereo images) is selected, any value calculated on the basis of such distance information may be set as the integrated distance. For example, the median, the maximum, or the minimum of the plurality of selected distance information may be set as the integrated distance. Also at this point, distance information whose value deviates sharply from values of other distance information may be deleted. Also, statistical information may be calculated by a predetermined function using each piece of distance information.

Incidentally, integrated distance information output from the output unit 193 may also be used for processing such as automatic driving, remote control, presentation of driving supplementary information and the like for the vehicle 101. Also, the distance information integration apparatus 150 may output the stereo image (captured images) set by the stereo image processing apparatus 130. For example, when the distance information integration apparatus 150 outputs integrated distance information, a stereo image (captured images) corresponding to the integrated distance information may be output. Also, the output information may be transferred to another apparatus or system or recorded in a recording medium. Also, the output information may be reused by the imaging system 100.

2. Second Embodiment

<Configuration of the Imaging System>

Figure 11:
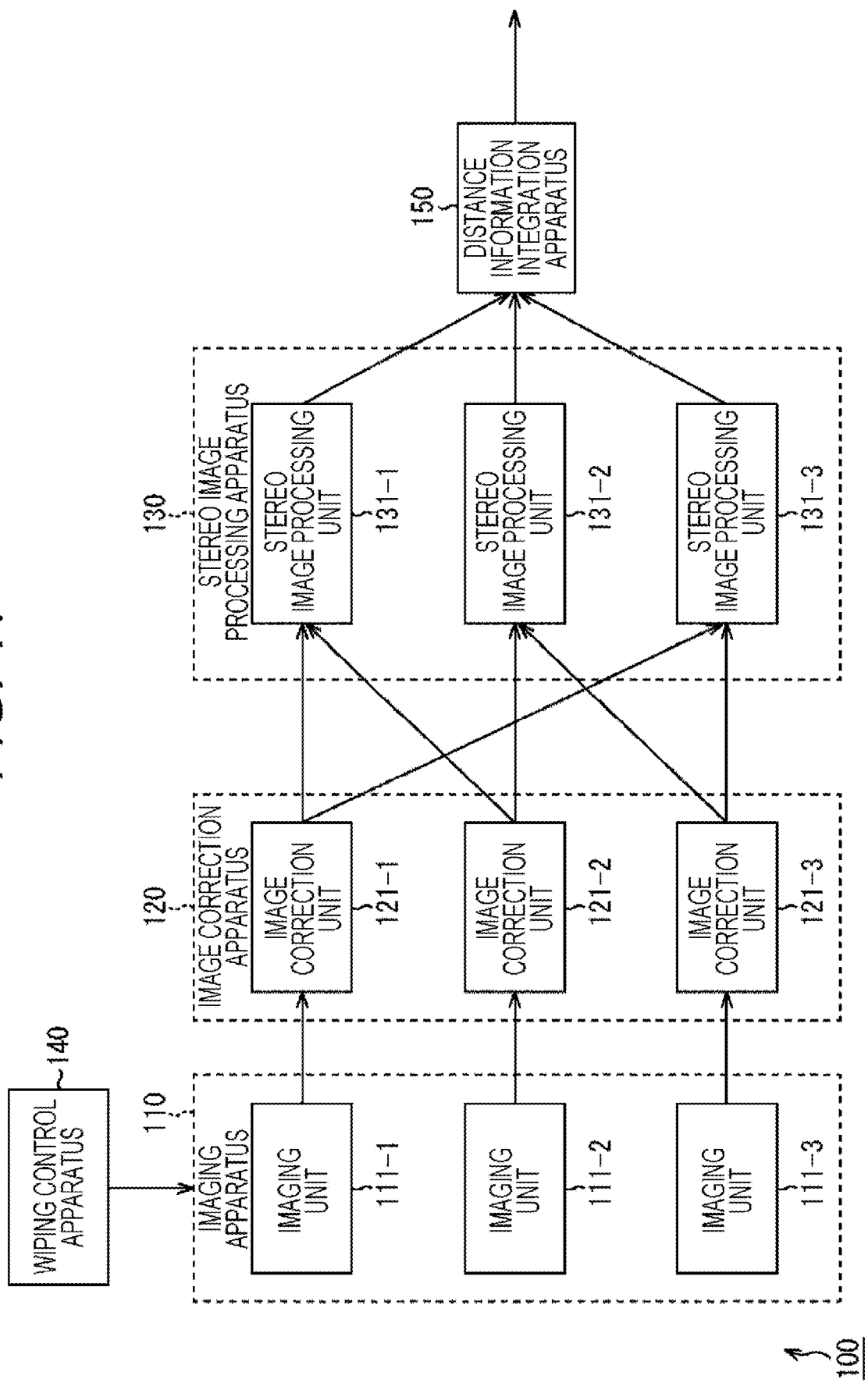
FIG. 11 is a block diagram showing a main configuration example of the imaging system.

Driving of the imaging unit 111 may be controlled on the basis of wiping control information. FIG. 11 is a block diagram showing a main configuration example of the imaging system 100 in that case. As shown in FIG. 11, also in this case, the imaging system 100 basically has a configuration similar to the configuration (FIG. 2) described in the first embodiment, but in this case, wiping control information supplied by the wiping control apparatus 140 is supplied to the imaging apparatus 110.

The imaging apparatus 110 selects, among the imaging units 111 possessed by the imaging apparatus, the imaging unit 111 in whose captured image the wiping apparatus does not appear on the basis of wiping control information and drives only the imaging unit 111 to generate a captured image. If, for example, the wiping apparatus appears in a captured image of the imaging unit 111-3, the imaging apparatus 110 drives the imaging units 111-1, 111-2 to generate captured images and halts the imaging unit 111-3.

The image correction apparatus 120 and the stereo image processing apparatus 130 drive only necessary processing units matching driving of the imaging unit 111. In the above example, for example, the image correction apparatus 120 drives the image correction units 121-1, 121-2 to make image corrections. Because the imaging unit 111-3 is halted, the image correction unit 121-3 is halted. Similarly, the stereo image processing apparatus 130 drives only the stereo image processing unit 131-1 to perform stereo image processing. Because the image correction unit 121-3 is halted, the stereo image processing unit 131-2, 131-3 are halted.

In this manner, like in the first embodiment, the imaging system 100 can suppress a decrease in reliability of distance measurements and also suppress driving of unnecessary processing units so that an increase of power consumption cab ne curbed.

<Flow of Distance Measurement Processing>

Figure 12:
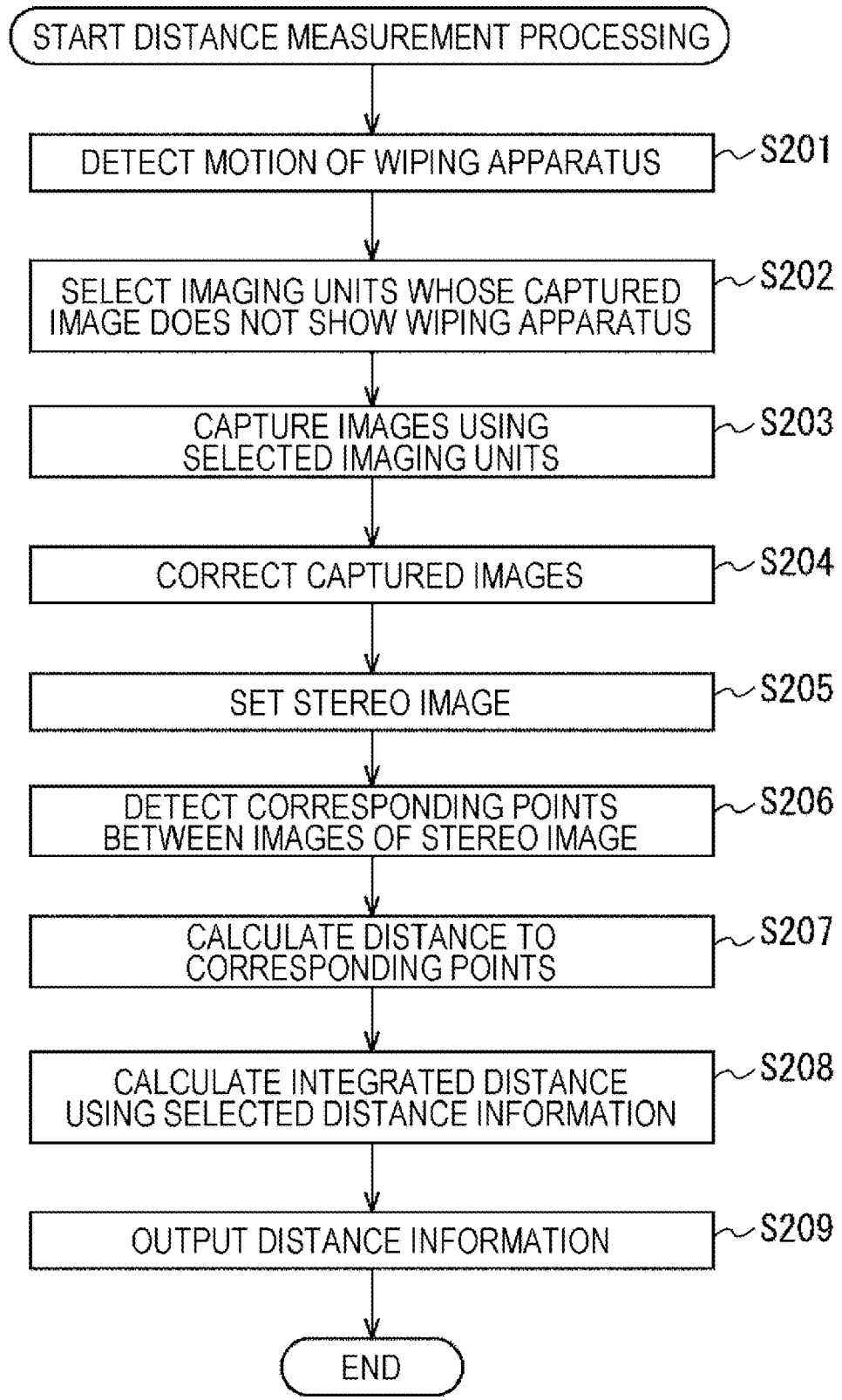
FIG. 12 is a flowchart illustrating an example of the flow of the distance measurement processing.

An example of the flow of distance measurement processing in this case will be described with reference to the flowchart in FIG. 12. In this case, when the distance measurement processing is started, in step S201, the imaging apparatus 110 detects motion of the wiping apparatus on the basis of wiping control information, in step S202, selects the imaging unit 111 in whose captured image the wiping apparatus does not appear, and in step S203, drives the imaging unit 111 that has been selected to capture an image.

Figure 9:
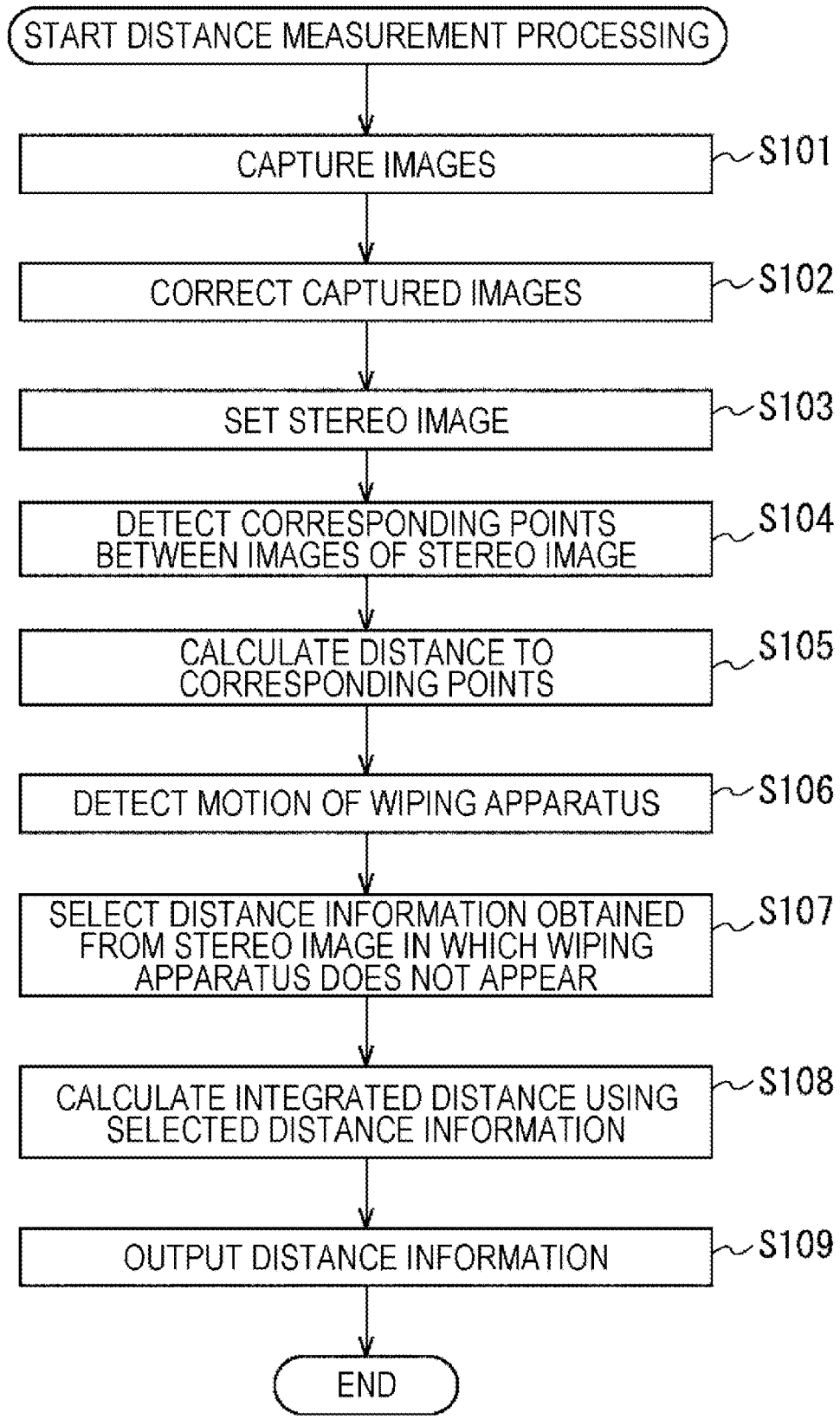
FIG. 9 is a flowchart illustrating an example of the flow of distance measurement processing.

Processing in steps S204 to S207 is performed in a similar manner to processing in steps S102 to S105 (FIG. 9). Also, processing in steps S208 and S209 is performed in a similar manner to processing in steps S108 and S109 (FIG. 9).

When the processing in step S209 terminates, the distance measurement processing terminates. By performing the distance measurement processing as described above, the imaging system 100 can suppress a decrease in reliability of distance measurements.

3. Third Embodiment

<Configuration of the Imaging System>

Figure 13:
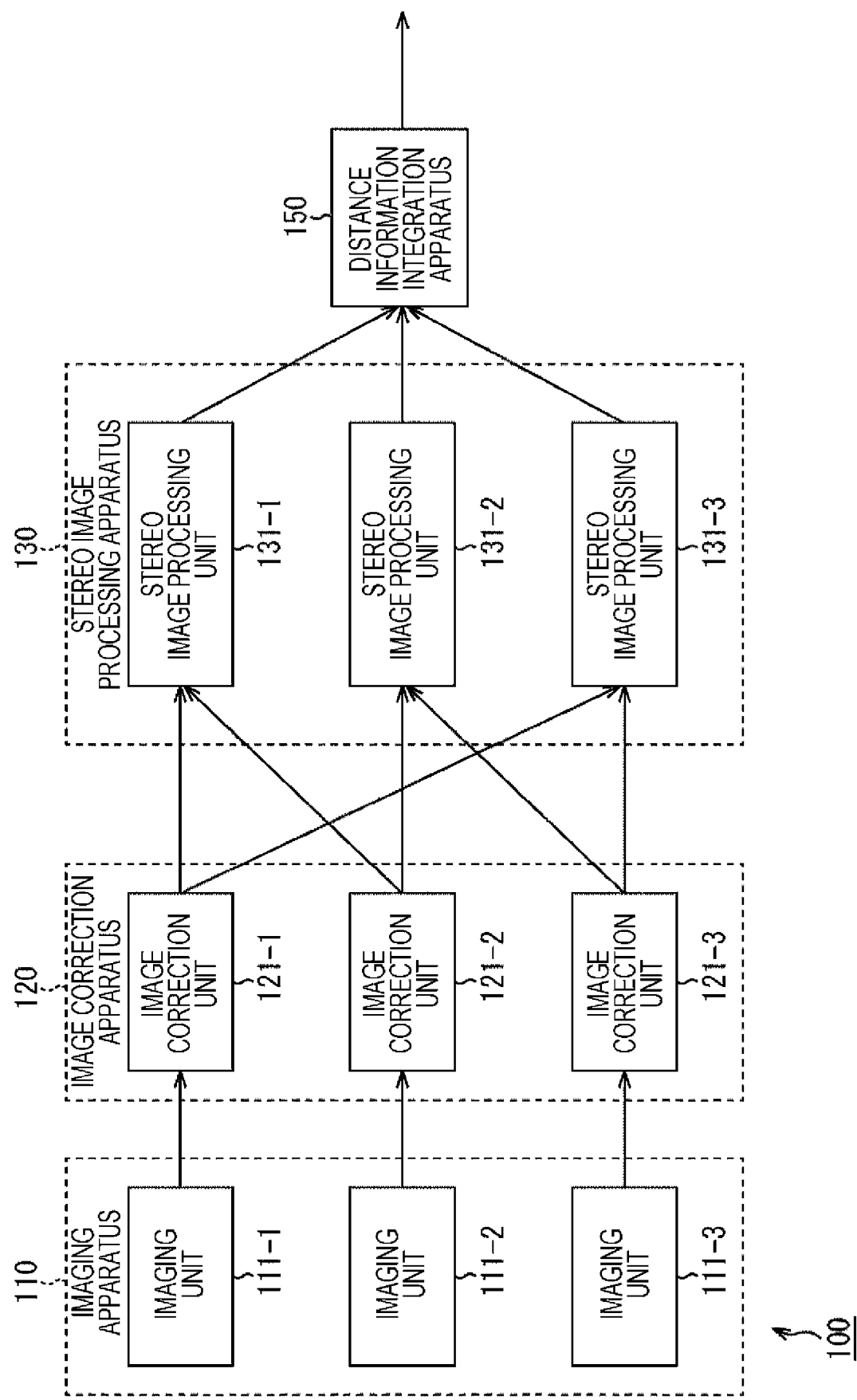
FIG. 13 is a block diagram showing a main configuration example of the imaging system.

The motion of the wiping apparatus may be detected from a stereo image (captured images). FIG. 13 is a block diagram showing a main configuration example of the imaging system 100 in that case. As shown in FIG. 13, also in this case, the imaging system 100 basically has a configuration similar to the configuration (FIG. 2) described in the first embodiment, but in this case, the distance information integration apparatus 150 detects motion of the wiping apparatus using a stereo image and therefore, the wiping control apparatus 140 can be omitted.

<Distance Information Integration Apparatus>

Figure 14:
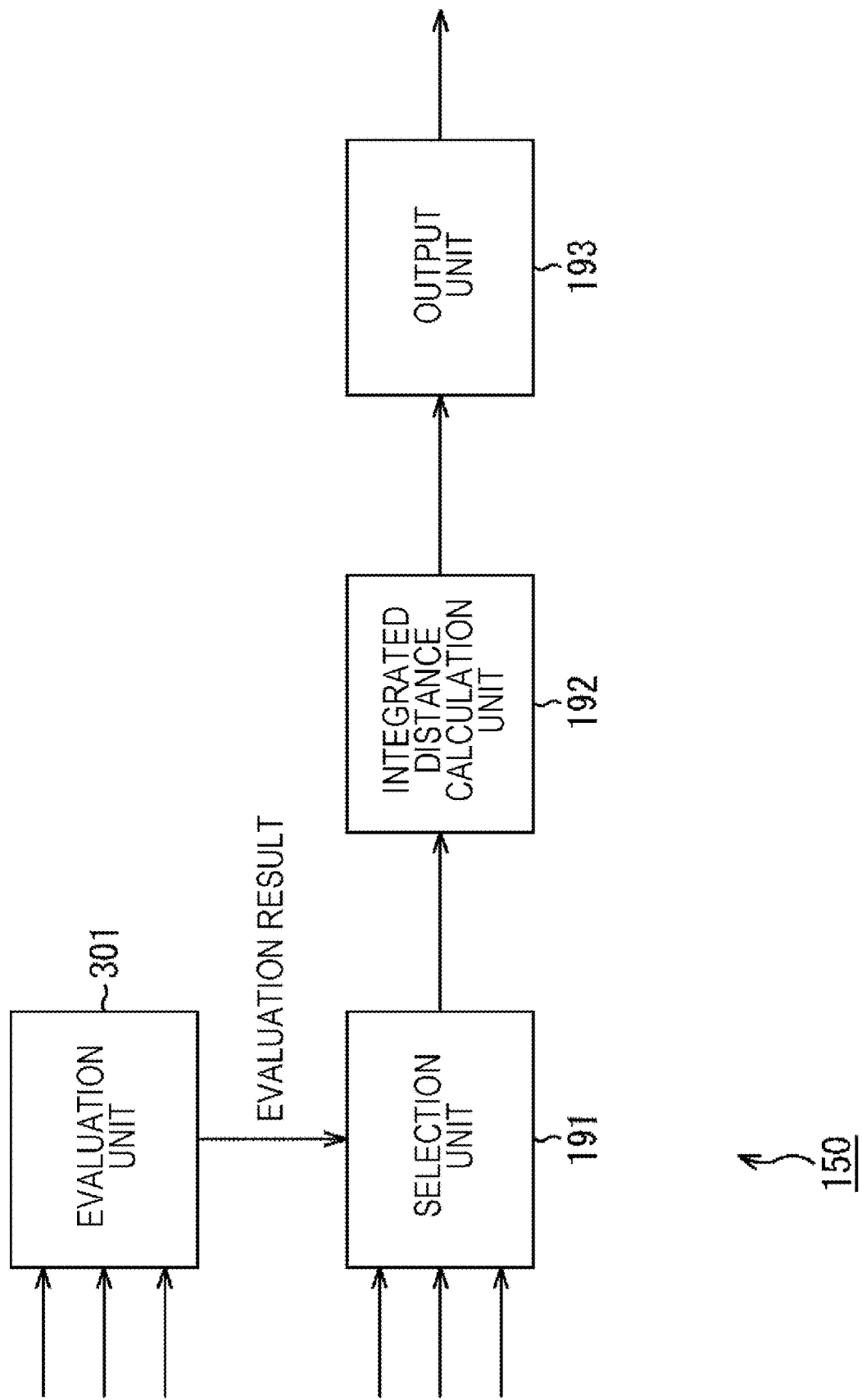
FIG. 14 is a block diagram showing a main configuration example of the distance information integration apparatus.

FIG. 14 is a block diagram showing a main configuration example of the distance information integration apparatus 150 (FIG. 13) in that case. As shown in FIG. 14, the distance information integration apparatus 150 in this case includes, for example, in addition to the selection unit 191 to the output unit 193, an evaluation unit 301.

The evaluation unit 301 determines and evaluates an evaluation value of distance information (stereo image) calculated by the stereo image processing apparatus 130. The evaluation unit 301 supplies an evaluation result thereof to the selection unit 191. The selection unit 191 selects distance information (stereo image or the imaging units 111) on the basis of the evaluation result supplied from the evaluation unit 301. That is, the selection unit 191 may be said to select distance information on the basis of an evaluation value or select distance information on the basis of the distance information (distance to an observation point).

The method of evaluation by the evaluation unit 301 may be any method and, for example, the evaluation unit 301 searches for corresponding points by block matching and evaluates the search (block matching) by any method. For example, the evaluation unit 301 evaluates the block matching by determining the sum of differential absolute values.

For example, an evaluation value E12 based on a luminance difference between two points P1(x1, y1) and P2(x2, y2) between two images and peripheral regions thereof can be determined by the following formula (2):

$$E12 = \Sigma_m \Sigma_n |I1(x1+m, y1+n) - I2(x2+m, y2+n)| \quad (2)$$

Luminance values in regions are closer with a decreasing value of the evaluation value E12 and images in two regions are rated more similar. It is assumed here that the object point P appears in P1(x1, y1), P2(x2, y2), and P3(x3, y3) of captured images generated by each of the imaging units 111. Here, an evaluation value based on a luminance difference between two points P1(x1, y1) and P2(x2, y2) and peripheral regions thereof is set as E12, an evaluation value based on a luminance difference between two points P2(x2, y2) and P3(x3, y3) and peripheral regions thereof is set as E23, and an evaluation value based on a luminance difference between two points P3(x3, y3) and P1(x1, y1) and peripheral regions thereof is set as E31. The evaluation values E12, E23, E31 can each be calculated using the above formula (2).

When, like the example of FIG. 7, the wiping apparatus such as a wiper does not appear in any of the captured images 201 to 203, the evaluation values E12 (evaluation value of P1 and P2), E23 (evaluation value of P2 and P3), E31 (evaluation value of P3 and P1) corresponding to each stereo image using these captured images are all low. Also, when, like the example of FIG. 8, a wiper appears in P3, E12 is low, but the luminance value of the object point and that of the wiping apparatus such as a wiper are different and thus, the values of E23 and E31 are high. Therefore, if, among three evaluation values in each pixel of three pairs of stereo images obtained by the imaging apparatus 110 having the three imaging units 111, the number of evaluation values higher than a certain threshold (Th) is two and the number of evaluation values lower than the certain threshold is one, corresponding points of the stereo image of the low evaluation value can be determined to be valid. Incidentally, a lower evaluation value of the sum of differential absolute values is better in block matching, but in, for example, an evaluation function like a normal cross correlation, a lower evaluation value is better and thus, the condition of the magnitude with respect to the threshold is reversed.

As described above, distance information (stereo image) not affected by the wiping apparatus can be selected by the distance information (stereo image) being evaluated by the evaluation unit 301 and the distance information (stereo image) being selected by the selection unit 191 in accordance with an evaluation result thereof. That is, the integrated distance calculation unit 192 can calculated integrated distance information without being affected by the wiping apparatus. Therefore, even if, for example, the wiping apparatus is operating, the selection unit 191 can select available distance information (stereo image) and the integrated distance calculation unit 192 can generate integrated distance information. That is, the distance information integration apparatus 150 can suppress an occurrence of circumstances in which distance measurements may not be made so that a decrease in reliability of distance measurements can be suppressed.

Incidentally, in this case, the selection unit 191 can decide which distance information (stereo image) to select for each pixel. That is, even if the wiping apparatus appears inside a captured image, the wiping apparatus generally affects only a portion of the captured image (it is difficult to calculate distance information from a portion of pixels of the captured image) and does not affect other portions. Therefore, distance information of the other portions can be used.

Figure 15:
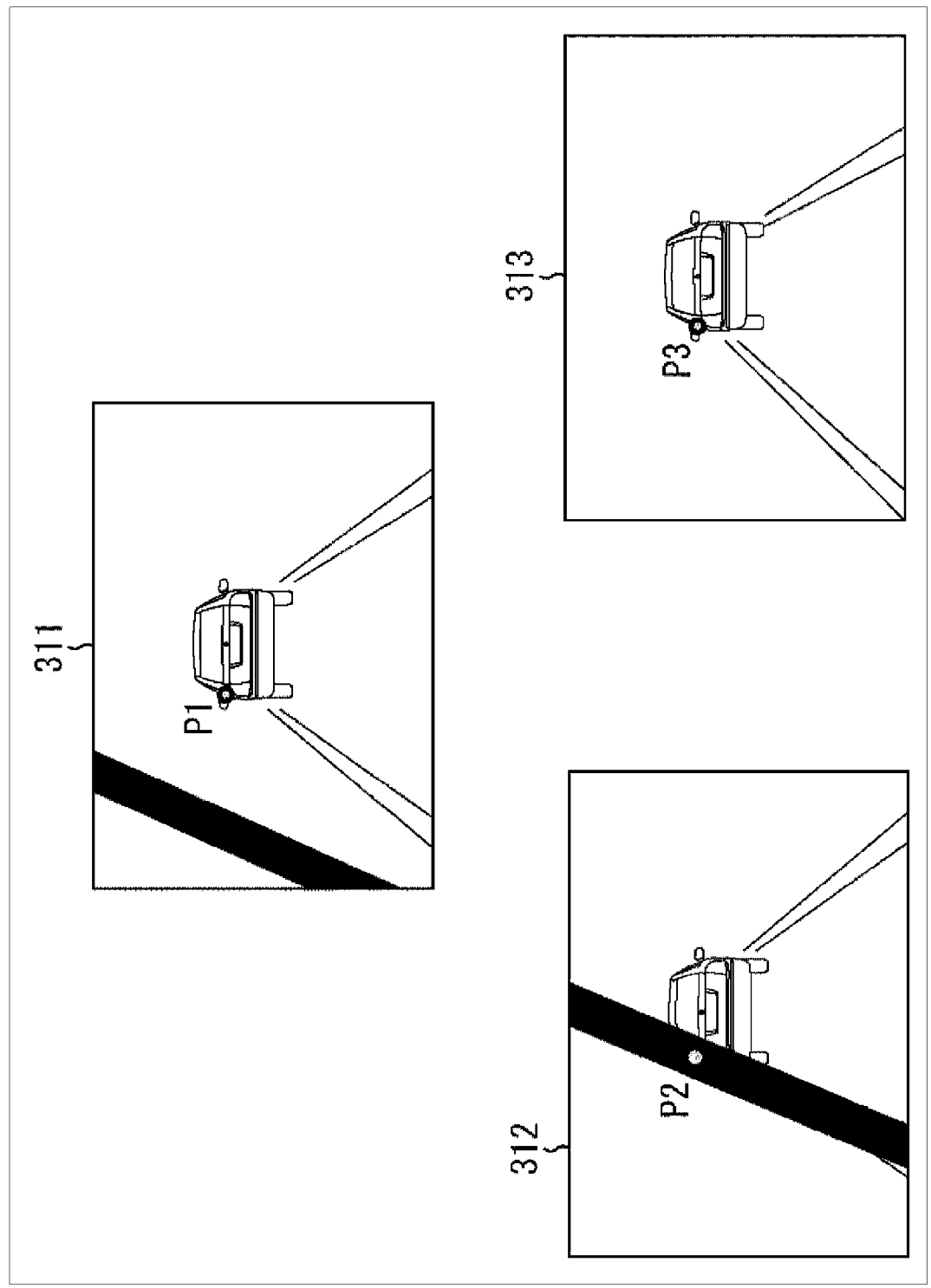
FIG. 15 is a diagram illustrating an example of how distance measurements are operated.
Figure 16:
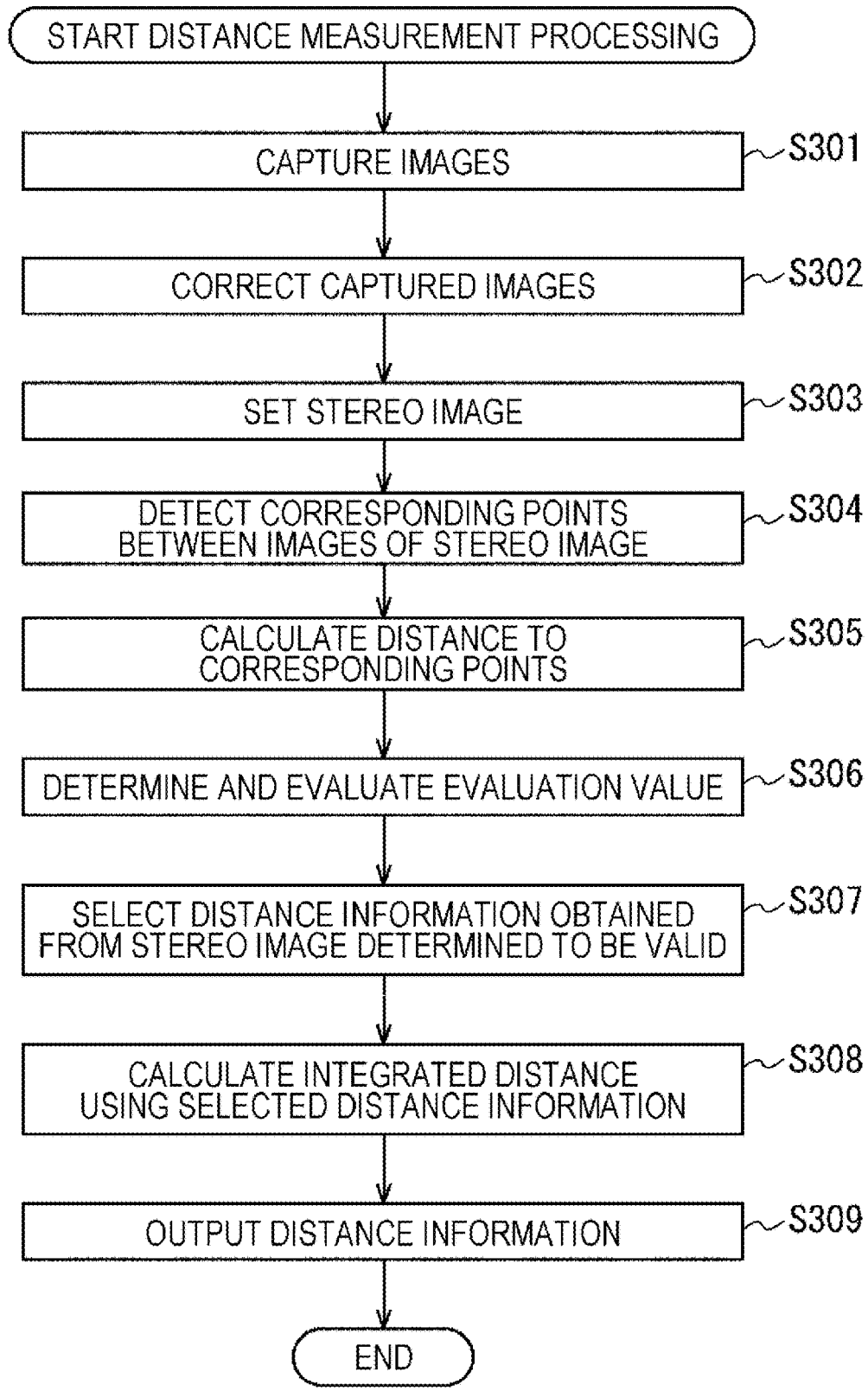
FIG. 16 is a flowchart illustrating an example of the flow of the distance measurement processing.

For example, in the case of FIG. 15, the wiping apparatus (black thick line) appears in both a captured image 311 obtained by the imaging unit 111-1 and a captured image 312 obtained by the imaging unit 111-2. However, a point P1 of the captured image 311 is not affected by the wiping apparatus. Therefore, the distance to an observation point (distance to a predetermined portion of the vehicle in front) can be calculated from the point P1 of the captured image 311 and a point P3 of a captured image 313. That is, even if the wiping apparatus is moving, distance information can be determined for more corresponding points. Therefore, a decrease in reliability of distance measurements can be suppressed.

<Flow of Distance Measurement Processing>

Next, the flow of processing performed by the imaging system 100 will be described. An example of the flow of distance measurement processing performed by the imaging system 100 will be described with reference to the flowchart in FIG. 9.

When the distance measurement processing is started, processing in steps S301 to S305 is performed in a similar manner to processing in steps S101 to S105 (FIG. 9).

In step S306, the evaluation unit 301 calculates and evaluates an evaluation value of each piece of distance information determined in step S305 (each stereo image set in step S303).

In step S307, the selection unit 191 selects distance information obtained from stereo images determined to be valid by the evaluation unit 301 in step S306.

Processing in steps S308 and S309 is performed in a similar manner to processing in steps S108 and S109 (FIG. 9).

When the processing in step S309 terminates, the distance measurement processing terminates. By performing the distance measurement processing as described above, the imaging system 100 can suppress a decrease in reliability of distance measurements.

<Application Example>

Incidentally, the evaluation unit 301 may use the evaluation values of block matching calculated when the corresponding point detection unit 172 of the stereo image processing unit 131 detects corresponding points as evaluation values of distance information (stereo image). In this manner, the amount of operation can be reduced and an increase of the load of processing can be suppressed. Naturally, the evaluation unit 301 may calculate evaluation values independently of detection of corresponding points.

Also, the threshold (Th) used by the evaluation unit 301 to evaluate evaluation values may be made settable by the user or the like. Also, the threshold (Th) may be made updatable.

Incidentally, in the foregoing, a description was provided like the imaging apparatus 110 being installed to image in the forward direction of the vehicle 101, but the installation location of the imaging apparatus 110 is arbitrary. Also, the number of installation locations is arbitrary. For example, as shown in FIG. 17, the imaging apparatus 110 may be installed in all installation locations of the vehicle 101 directed in all directions.

Figure 17:
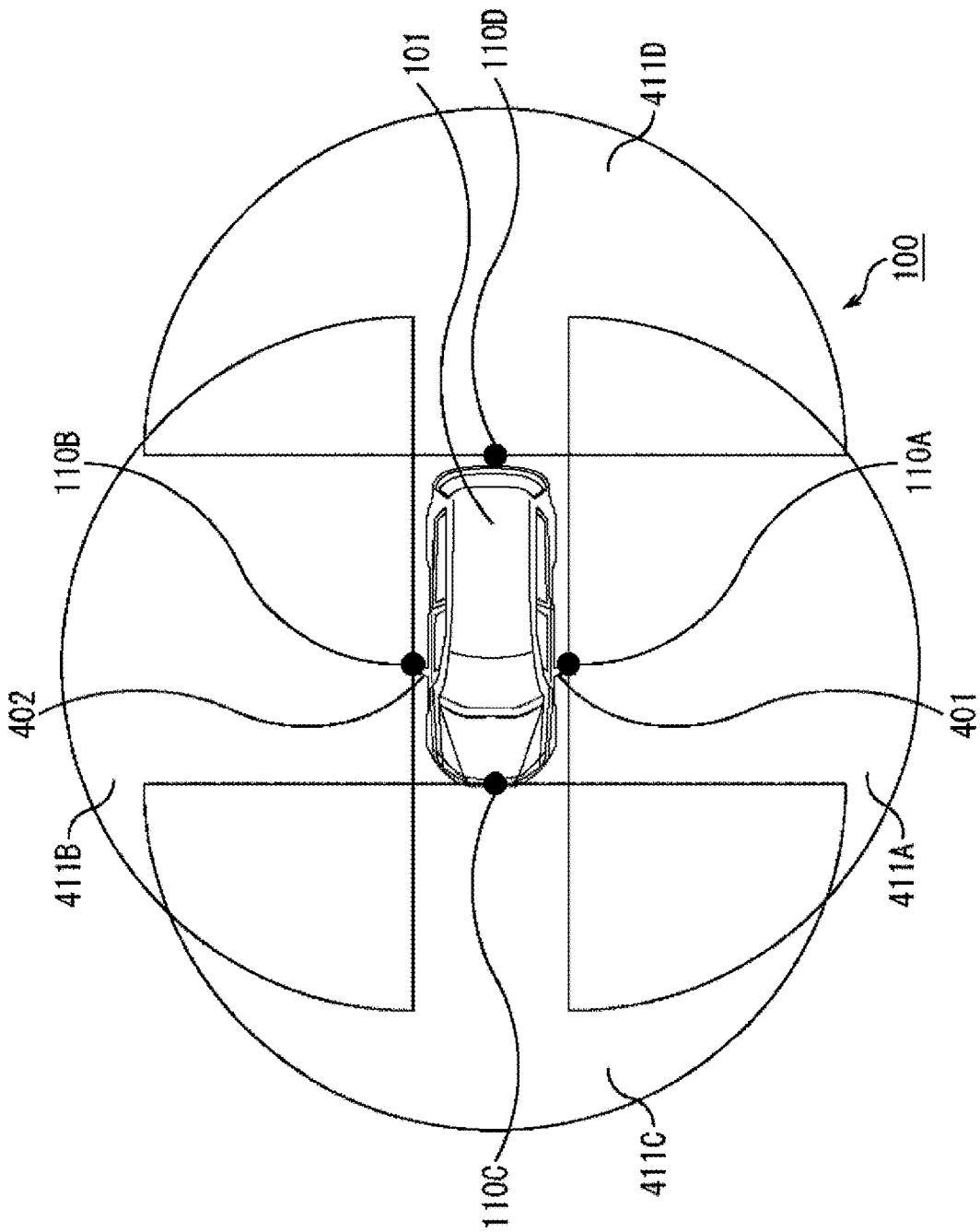
FIG. 17 is a diagram showing an arrangement example of imaging units.

In the case of FIG. 17, an imaging apparatus 110A is installed on a door mirror (side mirror) 401 on the left side face of the vehicle 101 or the neighborhood thereof in a direction allowing to image the left side of the vehicle 101. Also, an imaging apparatus 110B is installed on a door mirror (side mirror) 402 on the right side face of the vehicle 101 or the neighborhood thereof in a direction allowing to image the right side of the vehicle 101. Also, an imaging apparatus 110C is installed on the front bumper of the vehicle 101 or the neighborhood thereof in a direction allowing to image in the forward direction of the vehicle 101. Also, an imaging apparatus 110D is installed on the rear bumper of the vehicle 101 or the neighborhood thereof in a direction allowing to image in the backward direction of the vehicle 101.

Therefore, the imaging apparatus 110A images a subject in a detection range 411A. The imaging apparatus 110B images a subject in a detection range 411B. The imaging apparatus 110C images a subject in a detection range 411C. The imaging apparatus 110D images a subject in a detection range 411D.

Thus, the imaging system 100 can make distance measurements in all directions of the vehicle 101.

4. Fourth Embodiment

<Application Example>

The technology according to an embodiment of the present disclosure can be applied to various products. For example, the technology according to an embodiment of the present disclosure may be implemented as an apparatus mounted on one of mobile units such as automobiles, electric vehicles, hybrid electric vehicles, automatic bicycles, bicycles, personal mobile units, airplanes, drones, ships, robots, construction machinery, agricultural machinery and the like.

For example, the present technology may be applied to the automatic operation or remote control of such a mobile unit. Also, for example, the present technology may be applied to detect obstacles around a mobile unit and a destination and to make distance measurements thereto. Also when, for example, baggage is load onto a mobile unit to transport the baggage, the present technology may be applied to detect the baggage or to measure the distance to the baggage. To improve correctness of such an automatic operation or remote control, up-to-date information about conditions around a control object is demanded in real time (immediacy). Particularly, more up-to-date information is demanded for a control object operating (driving) faster. Also, in the case of the automatic operation or remote control in the open, an image sensor (a lens or the like) provided in a control object may more likely become dirty with rain, mud, dust or the like, which makes the possibility of decreased reliability of distance measurements more likely. A decrease in reliability of distance measurements can be suppressed by applying the present technology and therefore, a decrease of correctness of such an automatic operation or remote control can be suppressed.

Figure 18:
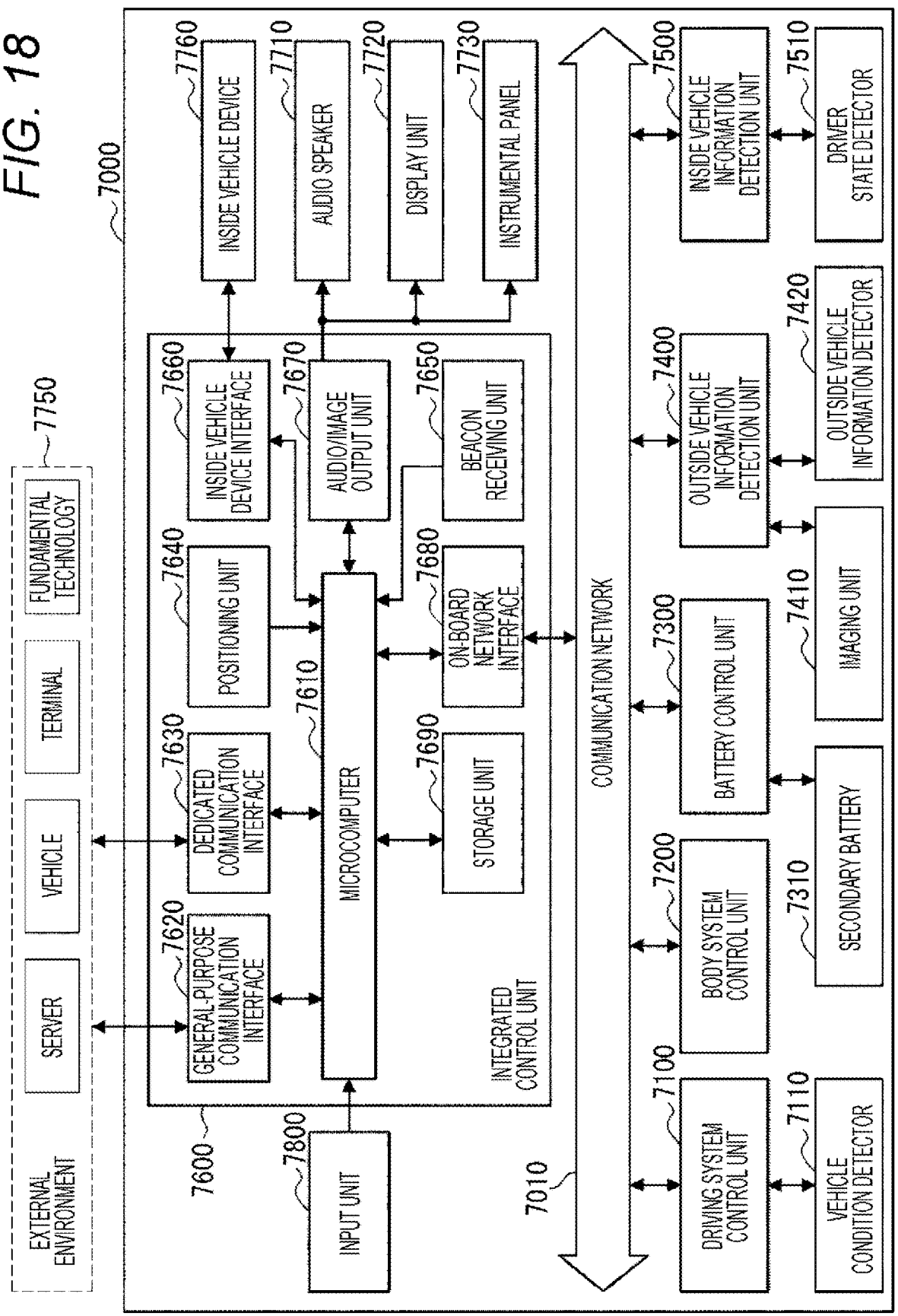
FIG. 18 is a block diagram showing an example of a schematic configuration of a vehicle control system.

FIG. 18 is a block diagram showing a schematic configuration example of a vehicle control system 7000 as an example of a mobile control system to which the technology according to an embodiment of the present disclosure can be applied. The vehicle control system 7000 includes a plurality of electronic control units connected via a communication network 7010. In the example shown in FIG. 18, the vehicle control system 7000 includes a driving system control unit 7100, a body system control unit 7200, a battery control unit 7300, an outside vehicle information detection unit 7400, an inside vehicle information detection unit 7500, and an integrated control unit 7600. The communication network 7010 connecting the plurality of control units may be an on-board communication network conforming to any standard, for example, Controller Area Network (CAN), Local Interconnect Network (LIN), Local Area Network (LAN), or FlexRay (registered trademark).

Each control unit includes a microcomputer that performs arithmetic processing according to various programs, a storage unit that stores programs executed by the microcomputer or parameters used for various kinds of arithmetic, and a driving circuit that drives various apparatuses to be controlled. Each control unit includes a network interface to perform communication with other control units via the communication network 7010 and also includes a communication interface to perform wire communication or wireless communication with apparatuses or sensors inside/outside the vehicle. In FIG. 18, as the functional configuration of the integrated control unit 7600, a microcomputer 7610, a general-purpose communication interface 7620, a dedicated communication interface 7630, a positioning unit 7640, a beacon receiving unit 7650, an inside apparatus interface 7660, an audio/image output unit 7670, an on-board network interface 7680, and a storage unit 7690. Similarly, other control units include a microcomputer, a communication interface, a storage unit and the like.

The driving system control unit 7100 controls the operation of apparatuses related to the driving system of a vehicle according to various programs. For example, the driving system control unit 7100 functions as a control apparatus of a driving force generation apparatus to generate a driving force of the vehicle such as an internal combustion engine or driving motor, a driving force transmission mechanism to transmit a driving force to wheels, a steering mechanism to adjust a rudder angle of the vehicle, and a braking apparatus that generates a braking force of the vehicle. The driving system control unit 7100 may also has a function as a control apparatus such as an antilock brake system (ABS) or an electronic stability control (ESC).

A vehicle condition detector 7110 is connected to the driving system control unit 7100. The vehicle condition detector 7110 includes at least one of, for example, a gyro-sensor that detects the angular velocity of axis rotation motion of a vehicle, an acceleration sensor that detects acceleration of the vehicle, and a sensor to detect the amount of operation of an accelerator pedal, the amount of operation of a brake pedal, the steering angle of a steering wheel, and the engine speed or rotational speed of a wheel. The driving system control unit 7100 performs arithmetic processing using a signal input from the vehicle condition detector 7110 to control an internal combustion engine, a driving motor, an electric power steering apparatus, a braking apparatus or the like.

The body system control unit 7200 controls the operation of various apparatus equipped in a vehicle. For example, the body system control unit 7200 functions as a keyless entry system, a smart key system, a power window apparatus, or various lamps such as a head lamp, a back lamp, a brake lamp, a winker, and a fog lamp. In such a case, a radio wave emitted from a mobile unit as an alternative for the key or a signal of various switches can be input into the body system control unit 7200. The body system control unit 7200 receives input of such a radio wave or signal to control a door lock apparatus of the vehicle, the power window apparatus, lamps and the like.

The battery control unit 7300 controls a secondary battery 7310 as a power supply source of the driving motor according to various programs. For example, information of the battery temperature, battery output voltage, residual capacity of the battery or the like can be input from a battery apparatus including the secondary battery 7310 into the battery control unit 7300. The battery control unit 7300 performs arithmetic processing using signals thereof to control temperature adjustments of the secondary battery 7310 or a cooling apparatus included in the battery apparatus.

The outside vehicle information detection unit 7400 detects information outside the vehicle mounted with the vehicle control system 7000. For example, at least one of an imaging unit 7410 and an outside information detector 7420 is connected to the outside vehicle information detection unit 7400. The imaging unit 7410 includes at least one of a time of flight (ToF) camera, a stereo camera, a monocular camera, an infrared camera, and other cameras. The outside information detector 7420 includes at least one of, for example, an environmental sensor to detect the current weather or meteorological phenomena and a surrounding information detection sensor to detect other vehicles, obstacles, or pedestrians around the vehicle mounted with the vehicle control system 7000.

The environmental sensor may be at least one of, for example, a raindrop sensor that detects rainy weather, a fog sensor that detects a fog, a sunshine sensor that detects the degree of sunshine, and a snow sensor that detects a snowfall. The surrounding information detection sensor may be at least one of, for example, an ultrasonic sensor, a radar apparatus, and a light detection and ranging, laser imaging detection and ranging) (LIDAR) apparatus. The imaging unit 7410 and the outside information detector 7420 may be provided as an independent sensor or apparatus or as an apparatus integrating a plurality of sensors or apparatuses.

Figure 19:
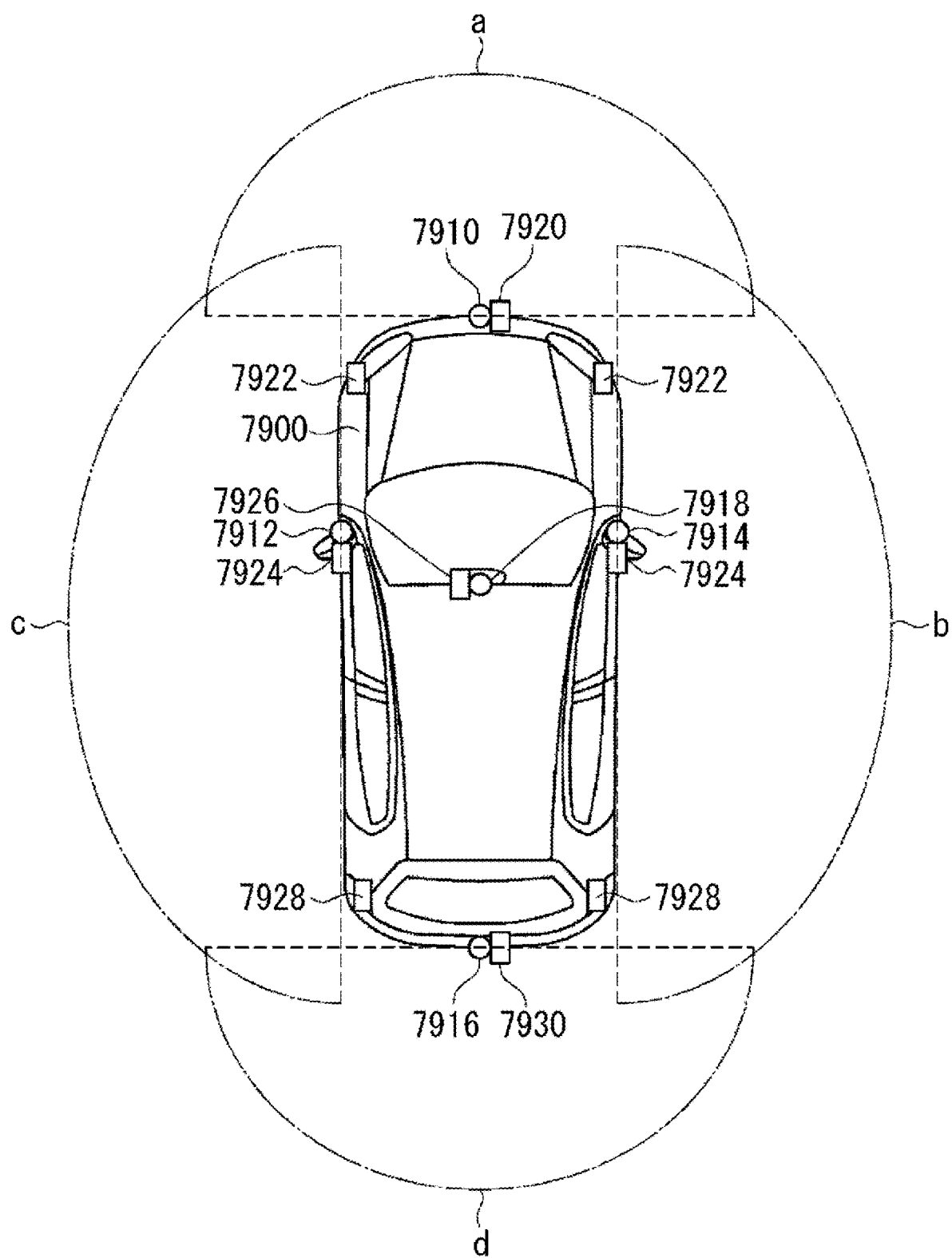
FIG. 19 is an explanatory view showing an example of installation positions of an outside vehicle information detection unit and the imaging unit.

Here, FIG. 19 shows an example of installation positions of the imaging unit 7410 and the outside information detector 7420. Imaging units 7910, 7912, 7914, 7916, 7918 are provided in at least one position of, for example, a front nose, a side minor, a rear bumper, a backdoor, and an upper portion of front glass inside the cabin of a vehicle 7900. The imaging unit 7910 provided on the front nose and the imaging unit 7918 provided in the upper portion of front glass inside the cabin mainly acquire images in front of the vehicle 7900. The imaging units 7912, 7914 provided on the side mirror mainly acquire images on the side of the vehicle 7900. The imaging unit 7916 provided on the rear bumper or backdoor mainly acquires images in the rear direction of the vehicle 7900. The imaging unit 7918 provided in the upper portion of front glass inside the cabin is mainly used to detect preceding vehicles, pedestrians, obstacles, signals, traffic signs, or traffic lanes.

Incidentally, in FIG. 19, an example of respective imaging ranges of the imaging units 7910, 7912, 7914, 7916 is shown. An imaging range a shows the imaging range of the imaging unit 7910 provided on the front nose, imaging ranges b, c show the imaging ranges of the imaging units 7912, 7914 provided on the side minor, respectively, and an imaging range d shows the imaging range of the imaging unit 7916 provided on the rear bumper or backdoor. For example, a downward image of the vehicle 7900 viewed from above can be acquired by superposing image data captured by the imaging units 7910, 7912, 7914, 7916.

Outside information detectors 7920, 7922, 7924, 7926, 7928, 7930 provided on the front, rear, side, corner, and in an upper portion of front glass in the cabin of the vehicle 7900 may be, for example, an ultrasonic sensor or a radar apparatus. The outside information detectors 7920, 7926, 7930 provided on the front nose, rear bumper, backdoor, and in the upper portion of front glass in the cabin of the vehicle 7900 may be, for example, a LIDAR apparatus. These outside information detectors 7920 to 7930 are mainly used to detect preceding vehicles, pedestrians, or obstacles.

The description will continue by returning to FIG. 18. The outside vehicle information detection unit 7400 causes the imaging unit 7410 to capture images outside the vehicle and also receives captured image data. The outside vehicle information detection unit 7400 also receives detection information from the outside information detector 7420 that is connected. If the outside information detector 7420 is an ultrasonic sensor, a radar apparatus, or a LIDAR apparatus, the outside vehicle information detection unit 7400 has an ultrasonic wave or an electromagnetic wave transmitted and also receives information of a received reflected wave. On the basis of received information, the outside vehicle information detection unit 7400 may perform object detection processing or distance detection processing of persons, vehicles, obstacles, signs, or letters on the road. On the basis of received information, the outside vehicle information detection unit 7400 may also perform environment recognition processing that recognizes a rainfall, a fog, or road conditions. On the basis of received information, the outside vehicle information detection unit 7400 may also calculate the distance to an object outside the vehicle.

Also, on the basis of received image data, the outside vehicle information detection unit 7400 may perform object detection processing or distance detection processing of persons, vehicles, obstacles, signs, or letters on the road. The outside vehicle information detection unit 7400 may also perform processing of distortion correction or alignment on received image data and generate a downward image or panorama image by combining image data captured by the imaging units 7410 that are different. The outside vehicle information detection unit 7400 may also perform viewpoint conversion processing using image data captured by the imaging units 7410 that are different.

The inside vehicle information detection unit 7500 detects information inside the vehicle. For example, a driver state detector 7510 that detects a driver's state is connected to the inside vehicle information detection unit 7500. The driver state detector 7510 may include a camera that images the driver, an organism sensor that detects organism information of the driver, or a microphone that collects voice in the cabin. The organism sensor is provided, for example, on a seating face, a steering wheel or the like to detect organism information of a passenger sitting in a seat or the driver sitting behind the steering wheel. The inside vehicle information detection unit 7500 may calculate the degree of fatigue or degree of concentration of the driver or determine whether the driver is dozing on the basis of detection information input from the driver state detector 7510. The inside vehicle information detection unit 7500 may also perform processing such as noise cancelling processing on collected voice signals.

The integrated control unit 7600 controls the overall operation inside the vehicle control system 7000. An input unit 7800 is connected to the integrated control unit 7600. The input unit 7800 is implemented by an apparatus that can be operated by a passenger for input, for example, a touch panel, a button, a microphone, a switch, or a lever. Data obtained by voice recognition of voice input through the microphone may be input into the integrated control unit 7600. The input unit 7800 may be a remote control apparatus using infrared rays or other radio waves or an external connection apparatus such as a mobile phone or a personal digital assistant (PDA) capable of operating the vehicle control system 7000. The input unit 7800 may also be, for example, a camera and in that case, the passenger can input information through a gesture. Alternatively, data obtained by detecting motion of a wearable apparatus worn by the passenger may be input. Further, the input unit 7800 may include, for example, an input control circuit or the like that generates an input signal on the basis of information input by the passenger or the like using the input unit 7800 and outputs the input signal to the integrated control unit 7600. By operating the input unit 7800, the passenger inputs various kinds of data into the vehicle control system 7000 or issues instructions of a processing operation thereto.

The storage unit 7690 may include a read only memory (ROM) that stores various programs executed by a microcomputer or a random access memory (RAM) that stores various parameters, operation results, sensor values and the like. Also, the storage unit 7690 may be implemented by a magnetic storage device such as a hard disc drive (HDD), a semiconductor storage device, an optical storage device, or a magneto-optical storage device.

The general-purpose communication interface 7620 is a general communication interface that mediates communication with various apparatuses present in an external environment 7750. The general-purpose communication interface 7620 may implement a cellular communication protocol such as Global System of Mobile communications (GSM), WiMAX, Long Term Evolution (LTE), or LTE-Advanced (LTE-A) or other wireless communication protocols such as wireless LAN (also called Wi-Fi (registered trademark)) or Bluetooth (registered trademark). The general-purpose communication interface 7620 may connect to an apparatus (for example, an application server or a control server) present in an external network (for example, the Internet a cloud network, or an enterprise-specific network) via a base station or an access point. Also, the general-purpose communication interface 7620 may connect to a terminal (for example, a driver, a pedestrian, a shop's terminal, or a machine type communication (MTC) terminal) present near the vehicle using, for example, the Peer to Peer (P2P) technology.

The dedicated communication interface 7630 is a communication interface that supports a communication protocol drafted for use by vehicles. The dedicated communication interface 7630 may implement a standard protocol, for example, Wireless Access in Vehicle Environment (WAVE) as a combination of IEEE802.11p of the lower layer and IEEE1609 of the upper layer, Dedicated Short Range Communications (DSRC), or the cellular communication protocol. The dedicated communication interface 7630 typically performs V2X communication as a concept including at least one of Vehicle to Vehicle communication, Vehicle to Infrastructure communication, Vehicle to Home communication, and Vehicle to Pedestrian communication.

The positioning unit 7640 performs positioning by receiving, for example, a global navigation satellite system (GNSS) signal (for example, a global positioning system (GPS) signal from a GPS satellite) from a GNSS satellite to generate positional information including the latitude, the longitude, and the altitude of the vehicle. Incidentally, the positioning unit 7640 may identify the current position by exchanging a signal with a wireless access point or acquire positional information from a terminal like a mobile phone, PHS, or a smartphone having a positioning function.

The beacon receiving unit 7650 receives, for example, a radio wave or an electro-magnetic wave transmitted from a wireless station or the like installed on the roadside to acquire information such as the current position, congestion, suspension of traffic, time necessary and the like. Incidentally, the function of the beacon receiving unit 7650 may be included in the dedicated communication interface 7630 described above.

The inside apparatus interface 7660 is a communication interface that mediates between the microcomputer 7610 and various inside apparatuses 7760 present inside the vehicle. The inside apparatus interface 7660 may establish wireless communication by using a wireless communication protocol such as wireless LAN, Bluetooth (registered trademark), Near Field Communication (NFC), and Wireless USB (WUSB). The inside apparatus interface 7660 may also establish wire communication of Universal Serial Bus (USB), High-Definition Multimedia Interface (HDMI), or Mobile High-definition Link (MHL) via a connection terminal (not shown) (and a cable if necessary). The inside apparatus 7760 may include, for example, a mobile apparatus or a wearable apparatus possessed by a passenger or at least one of information apparatuses loaded into the vehicle or mounted thereon. Also, the inside apparatus 7760 may include a navigation apparatus used to search for the path to any destination. The inside apparatus interface 7660 exchanges a control signal or a data signal with these inside apparatuses 7760.

The on-board network interface 7680 is an interface that mediates communication between the microcomputer 7610 and the communication network 7010. The on-board network interface 7680 transmits and receives a signal and the like by conforming to a predetermined protocol supported by the communication network 7010.

The microcomputer 7610 of the integrated control unit 7600 controls the vehicle control system 7000 according to various programs on the basis of information acquired via at least one of the general-purpose communication interface 7620, the dedicated communication interface 7630, the positioning unit 7640, the beacon receiving unit 7650, the inside apparatus interface 7660, and the on-board network interface 7680. For example, the microcomputer 7610 may calculate a control target of the driving force generation apparatus, steering mechanism, or braking apparatus to output a control command to the driving system control unit 7100 on the basis of information inside/outside the vehicle. For example, the microcomputer 7610 may exercise cooperative control for the purpose of implementing the function of the advanced driver assistance system (ADAS) including the collision avoidance or shock mitigation of a vehicle, following traveling based on the distance between vehicles, speed maintenance traveling, collision warning of a vehicle, lane deviation warning of a vehicle and the like. Also, the microcomputer 7610 may exercise cooperative control intended for automatic driving without depending on the driver's operation by controlling the driving force generation apparatus, steering mechanism, or braking apparatus on the basis of information acquired around the vehicle.

The microcomputer 7610 may create three-dimensional distance information between the vehicle and surrounding objects such as structures and persons on the basis of information acquired via at least one of the general-purpose communication interface 7620, the dedicated communication interface 7630, the positioning unit 7640, the beacon receiving unit 7650, the inside apparatus interface 7660, and the on-board network interface 7680 to create local map information including surrounding information of the current position of the vehicle. Also, the microcomputer 7610 may predict the collision of vehicles, proximity of pedestrians, approach to a road for which traffic is suspended and the like and generate a warning signal on the basis of acquired information. The warning signal may be, for example, a signal to generate warning sound or to turn on a warning lamp.

The audio/image output unit 7670 transmits an output signal of at least one of audio and images to an output apparatus capable of visual or auditory notification of information. In the example of FIG. 18, an audio speaker 7710, a display unit 7720, and an instrumental panel 7730 are illustrated as output apparatuses. The display unit 7720 may include, for example, at least one of an on-board display and a head-up display. The display unit 7720 may include an augmented reality (AR) display function. The output apparatus may be other apparatuses than these apparatuses such as a headphone, a wearable device like an eyeglass-type display worn by the passenger, a projector, and a lamp. If the output apparatus is a display apparatus, the display apparatus visually displays results of obtained by various kinds of processing performed by the microcomputer 7610 or information received from other control units in various formats such as text, images, tables, graphs, and the like. Also, if the output apparatus is an audio output apparatus, the audio output apparatus converts an audio signal including reproduced audio data or acoustic data into an analog signal before auditory output.

Incidentally, in the example shown in FIG. 18, at least two control units connected via the communication network 7010 may be integrated into one control unit. Alternatively, individual control units may be constructed of a plurality of control units. Further, the vehicle control system 7000 may include other control units that are not illustrated. In the above description, a portion or all of the function exercised by one of control units may be given to another control unit. That is, if information can be transmitted and received via the communication network 7010, predetermined arithmetic processing may be performed by any control unit. Similarly, if a sensor or an apparatus connected to one of control units may be connected to other control units and also a plurality of control units may mutually transmit and receive detection information via the communication network 7010.

Incidentally, a computer program to implement each function of the imaging system 100 according to the present embodiment described using FIGS. 1 to 17 can be installed on any control unit. Also, a computer-readable recording medium in which such a computer program is stored can be provided. The recording medium is, for example, a magnetic disk, an optical disk, a magneto-optical disk, a flash memory or the like. Also, the above computer program may be delivered via, for example, a network without the recording medium.

In the vehicle control system 7000 described above, the imaging system 100 according to the present embodiment described using FIGS. 1 to 17 can be applied to the integrated control unit 7600 in the application example shown in FIG. 18. For example, each configuration described with reference to FIGS. 2, 4, 6, and 13 corresponds to the microcomputer 7610, the storage unit 7690, and the on-board network interface 7680 of the integrated control unit 7600. For example, the integrated control unit 7600 selects from a plurality of stereo images one or more stereo images including two captured images of an observation point captured from mutually different positions and detects the distance to the observation point using the distance to the observation point detected using the detected stereo image corresponding to the stereo image to be able to suppress a decrease in reliability of distance measurements.

Also, at least a portion of components of the imaging system 100 described using FIGS. 1 to 17 may be implemented in a module (for example, an integrated circuit module constructed of one die) for the integrated control unit 7600 shown in FIG. 18. Alternatively, the imaging system 100 described using FIGS. 1 to 17 may be implemented by a plurality of control units of the vehicle control system 7000 shown in FIG. 18.

Incidentally, hardware may be caused to perform a portion of a set of processing described above and software may be caused to perform the rest.

<Others>

Embodiments of the present technology are not limited to the above embodiments and various modifications can be made without deviating from the spirit of the present technology.

Also, for example, the present technology can be carried out in all configurations constituting an apparatus or a system, for example, a processor as system LSI (Large Scale Integration), a module using a plurality of processors and the like, a unit using a plurality of modules and the like, or a set in which other functions are added to a unit (that is, a partial configuration of an apparatus).

Incidentally, in this specification, a system means a set of a plurality of components (apparatuses, modules and the like) and it does not matter whether all components are in the same housing. Therefore, a plurality of apparatuses housed in separate housings and connected via a network and one apparatus in which a plurality of modules is housed in one housing are each a system.

Also, for example, a configuration described as one apparatus (or one processing unit) may be divided and configured as a plurality of apparatuses (or processing units). Conversely, a configuration described as a plurality of apparatuses (or processing units) in the foregoing may be merged and configured as one apparatus (or one processing unit). Also, a configuration other than the above ones may naturally be added to the configuration of each apparatus (or each processing unit). Further, if the configuration and operation are substantially the same as a whole system, a portion of the configuration of some apparatus (or some processing unit) may be included in the configuration of another apparatus (or another processing unit).

Also, for example, the present technology can adopt a configuration of cloud computing in which one function is performed by a plurality of apparatuses sharing and cooperating via a network.

Also, for example, the above program can be executed on any apparatus. In that case, the apparatus may be allowed to have necessary functions (functional blocks and the like) and to obtain necessary information.

Also, for example, each step described in the above flowcharts may be shared and performed by a plurality of apparatuses, as well as performed by one apparatus. Further, if one step includes a plurality of pieces of processing, the plurality of pieces of processing included in one step may be shared and performed by a plurality of apparatuses, as well as performed by one apparatus. In other words, a plurality of pieces of processing contained in one step may be performed as processing of a plurality of steps. Conversely, a piece of processing described as a plurality of steps may be performed together as one step.

Incidentally, in a program executed by a computer, processing of steps describing the program may be performed chronologically in the order described in this specification, in parallel, or individually in necessary timing when, for example, an invocation is made. That is, if not conflict arises, processing of each step may be performed in a different order from the above order. Further, processing of steps describing the program may be performed in parallel with processing of another program or in combination with processing of another program.

Incidentally, a plurality of the present technologies described in this specification can be independently carried out alone as long as no conflict arises. Naturally, any plurality of the present technologies can be carried out in combination. For example, a portion or all of the present technology described in one embodiment may be carried out in combination with a portion or all of the present technology described in another embodiment. Also, a portion or all of the present technology described in any one of the above embodiments may be carried out in combination with another technology not described above.

Incidentally, the present technology can adopt the following configuration:

(1)

An automobile-mounted imaging apparatus for detecting a distance to at least one object, the apparatus comprising:
circuitry configured to:
select at least two images from images captured by at least three cameras to use for detecting the distance to the at least one object based on at least one condition.

(2)

The apparatus of (1), wherein a first distance between the two cameras of the at least three cameras is equal to a second distance between either of the two cameras and a camera of the at least three cameras from which an image was not selected.

(3)

The apparatus of (1), wherein the at least one condition comprises at least one obstruction in a view of at least one of the at least three cameras.

(4)

The apparatus of (3), wherein the at least one obstruction comprises at least one of fog, dust, or mist.

(5)

The apparatus of (1), wherein the at least one condition comprises wiping control information indicating that at least one wiper is interfering with at least one of the at least three cameras.

(6)

The apparatus of (1), wherein the at least one condition comprises a status of a wiper that causes interference with at least one of the at least three cameras.

(7)

The apparatus of (1), wherein the circuitry is configured to receive distance information corresponding to at least one of the at least three cameras.

(8)

The apparatus of (1), wherein the circuitry is configured to, after selecting the at least two images from the images captured by the at least three cameras to use for detecting the distance, select distance information corresponding to cameras of which images were selected to be used for detecting the distance.

(9)

The apparatus of (1), wherein the circuitry is configured to select the at least two images from the images captured by the at least three cameras to use for detecting the distance in real time.

(10)

The apparatus of (1), wherein the circuitry is configured to receive information from each of the at least three cameras and select the at least two images from the images captured by the at least three cameras to use for detecting the distance further based on the received information.

(11)

At least one non-transitory computer readable storage medium having stored thereon instructions that, when executed by at least one processor, perform a method for detecting a distance to at least one object using an automobile-mounted imaging apparatus, the method comprising:
determining which of at least two images captured by at least three cameras of the automobile-mounted imaging apparatus to use for detecting the distance to the at least one object based on at least one condition.

(12)

An automobile-mounted imaging apparatus for detecting a distance to at least one object, the apparatus comprising:
circuitry configured to:
select two cameras of at least three cameras for detecting the distance to the at least one object based on at least one condition.

(13)

The apparatus of (12), wherein a first distance between the selected two cameras of the at least three cameras is equal to a second distance between either of the selected two cameras and an unselected camera of the at least three cameras.

(14)

The apparatus of (12), wherein the at least one condition comprises at least one obstruction in a view of at least one of the at least three cameras.

(15)

The apparatus of (12), wherein the at least one condition comprises wiping control information indicating that at least one wiper is interfering with at least one of the at least three cameras.

(16)

The apparatus of (12), wherein the circuitry is configured to receive distance information corresponding to at least one of the at least three cameras.

(17)

The apparatus of (12), wherein the circuitry is configured to, after selecting the two cameras of the at least three cameras for detecting the distance, determine distance information corresponding to cameras selected.

(18)

The apparatus of (12), wherein the circuitry is configured to receive information from each of the at least three cameras and select the two cameras of the at least three cameras for detecting the distance further based on the received information.

(19)

An automobile-mounted imaging apparatus for detecting a distance to at least one object, the apparatus comprising:
circuitry configured to:
determine which of at least two cameras to use for detecting the distance to the at least one object based on at least one condition from at least three cameras capturing images.

Furthermore, the present technology can also be adopted in the following configuration:

(1) An information processing apparatus including:
a selection unit that selects two imaging units that perform imaging to generate distance information from three or more imaging units constituting an image pickup unit; and
a distance detection unit that detects a distance to an observation point on the basis of captured images by the two imaging units selected.

(2) The information processing apparatus according to (1), in which
the selection unit selects the imaging units on the basis of an operation of a configuration influencing the captured images.

(3) The information processing apparatus according to (1) or (2), wherein
the configuration is a wiping apparatus provided in a vehicle and
the selection unit is configured to select the imaging units on the basis of the operation of the wiping apparatus that may appear in the captured images.

(4) The information processing apparatus according to any of (1) to (3), further including:
a control unit that controls the operation of the wiping apparatus, wherein
the selection unit is configured to select the imaging units on the basis of control information about the operation of the wiping apparatus supplied by the control unit.

(5) The information processing apparatus according to any of (1) to (4), further including:
a stereo image processing unit that sets a stereo image consisting of the captured images by the two imaging units, wherein
the selection unit is configured to select the two imaging units corresponding to the stereo image by selecting the stereo image set by the stereo image processing unit.

(6) The information processing apparatus according to any of (1) to (5), wherein
the stereo image processing unit detects the distance to the observation point on the basis of the stereo image set and
the selection unit selects the stereo image on the basis of the distance to the observation point detected by the stereo image processing unit on the basis of the stereo image.

(7) The information processing apparatus according to any of (1) to (6), further including:
an evaluation unit that calculates an evaluation value to evaluate the distance to the observation point detected on the basis of the stereo image, wherein
the selection unit is configured to select the stereo image on the basis of the evaluation value calculated by the evaluation unit.

(8) The information processing apparatus according to any of (1) to (7), wherein
the selection unit selects a plurality of the stereo images and
the distance detection unit integrates the distance to the observation point based on each of the plurality of stereo images selected to set the distance to the observation point detected by the distance detection unit.

(9) The information processing apparatus according to any of (1) to (8), wherein the distance detection unit sets an average, a median, a maximum value, or a minimum value of the distances to the observation point based on the stereo images as the distance to the observation point detected by the distance detection unit.

(10) The information processing apparatus according to any of (1) to (9), wherein
the selection unit selects a singular number of the stereo image and
the distance detection unit sets the distance to the observation point based on the singular number of the stereo image selected as the distance to the observation point detected by the distance detection unit.

(11) The information processing apparatus according to any of (1) to (10), further including:
an image correction unit that corrects the captured image, wherein
the stereo image processing unit is configured to set the stereo image consisting of the two captured images corrected by the image correction unit.

(12) The information processing apparatus according to any of (1) to (11), further including:
the three or more imaging units constituting the image pickup unit.

(13) The information processing apparatus according to any of (1) to (12), wherein a relative positional relationship of the imaging units of the image pickup unit is known.

(14) The information processing apparatus according to any of (1) to (13), wherein the imaging units of the image pickup unit are arranged so as to constitute a polygonal shape.

(15) The information processing apparatus according to any of (1) to (14), wherein the imaging units of the image pickup unit are arranged so as to constitute each vertex of an equilateral triangle or a right-angled triangle.

(16) The information processing apparatus according to any of (1) to (15), wherein the imaging units of the image pickup unit are arranged in a straight line.

(17) The information processing apparatus according to any of (1) to (16), further including:

an output unit that outputs information indicating the distance to the observation point detected by the distance detection unit.

(18) An information processing method including:

selecting two imaging units that perform imaging to generate distance information from three or more imaging units constituting an image pickup unit; and detecting a distance to an observation point on the basis of captured images by the two imaging units selected.

(19) A vehicle including:

a selection unit that selects two imaging units that perform imaging to generate distance information from three or more imaging units constituting an image pickup unit; and a distance detection unit that detects a distance to an observation point on the basis of captured images by the two imaging units selected.

(20) An information processing system including:

an imaging apparatus that images a subject; and an information processing apparatus that performs information processing related to a captured image captured by the imaging apparatus, wherein the imaging apparatus
includes
three or more imaging units and
the information processing apparatus
includes
a selection unit that selects two imaging units that perform imaging to generate distance information from the three or more imaging units of the imaging apparatus; and a distance detection unit that detects a distance to an observation point on the basis of captured images by the two imaging units selected.

REFERENCE SIGNS LIST

100 Imaging system
101 Vehicle
110 Imaging apparatus
111 Imaging unit
120 Image correction apparatus
121 Image correction unit
130 Stereo image processing apparatus
131 Stereo image processing unit
140 Wiping control apparatus
150 Distance information integration apparatus
171 Stereo image setting unit
172 Corresponding point detection unit
173 Distance calculation unit 191 Selection unit
192 Integrated distance calculation unit
193 Output unit
301 Evaluation unit

The invention claimed is:

1. A vehicle-mounted imaging apparatus for detecting a distance to at least one object, the apparatus comprising:
circuitry configured to:
select at least two images from images captured by two cameras of at least three cameras based on at least one condition; and
detect the distance to the at least one object by using disparity of the two selected images, wherein optical systems of the three cameras are spaced apart at mutually different positions by distances which are greater than diameters of the optical systems wherein a first distance between a first pair of two cameras of the three cameras, a second distance between a second pair of two cameras of the three cameras and a third distance between a third pair of two cameras of the three cameras are the same and wherein the distance to the at least one object is detected by the two cameras without calibrating parallax of the two selected images.

2. The apparatus of claim 1, wherein the at least one condition comprises at least one obstruction in a view of at least one of the at least three cameras.

3. The apparatus of claim 2, wherein the at least one obstruction comprises at least one of fog, dust, or mist.

4. The apparatus of claim 1, wherein the at least one condition comprises wiping control information indicating that at least one wiper is interfering with at least one of the at least three cameras.

5. The apparatus of claim 1, wherein the at least one condition comprises a status of a wiper that causes interference with at least one of the at least three cameras.

6. The apparatus of claim 1, wherein the circuitry is configured to receive distance information corresponding to at least one of the at least three cameras.

7. The apparatus of claim 1, wherein the circuitry is configured to, after selecting the at least two images from the images captured by the at least three cameras to use for detecting the distance, select distance information corresponding to cameras of which images were selected to be used for detecting the distance.

8. The apparatus of claim 1, wherein the circuitry is configured to select the at least two images from the images captured by the at least three cameras to use for detecting the distance in real time.

9. The apparatus of claim 1, wherein the circuitry is configured to receive information from each of the at least three cameras and select the at least two images from the images captured by the at least three cameras to use for detecting the distance further based on the received information.

10. A vehicle-mounted imaging apparatus for detecting a distance to at least one object, the apparatus comprising:
circuitry configured to:
select two cameras of at least three cameras based on at least one condition; and
detect the distance to the at least one object by using disparity of images captured by the two selected cameras, wherein optical systems of the three cameras are spaced apart at mutually different positions by distances which are greater than diameters of the optical systems, wherein a first distance between a first pair of two cameras of the three cameras, a second distance between a second pair of two cameras of the three cameras and a third distance between a third pair of two cameras of the three cameras are the same and wherein the distance to the at least one object is detected by the two cameras without calibrating parallax of the two selected images.

11. The apparatus of claim 10, wherein the at least one condition comprises at least one obstruction in a view of at least one of the at least three cameras.

12. The apparatus of claim 10, wherein the at least one condition comprises wiping control information indicating that at least one wiper is interfering with at least one of the at least three cameras.

13. The apparatus of claim 10, wherein the circuitry is configured to receive distance information corresponding to at least one of the at least three cameras.

14. The apparatus of claim 10, wherein the circuitry is configured to, after selecting the two cameras of the at least three cameras for detecting the distance, determine distance information corresponding to cameras selected.

15. The apparatus of claim 10, wherein the circuitry is configured to receive information from each of the at least three cameras and select the two cameras of the at least three cameras for detecting the distance further based on the received information.

16. A method for detecting a distance to at least one object, the method comprising:
selecting at least two images from images captured by two cameras of at least three cameras based on at least one condition; and
detecting the distance to the at least one object by using disparity of the two selected images, wherein optical systems of the three cameras are spaced apart at mutually different positions by distances which are greater than diameters of the optical systems, wherein a first distance between a first pair of two cameras of the three cameras, a second distance between a second pair of two cameras of the three cameras and a third distance between a third pair of two cameras of the three cameras are the same and wherein the distance to the at least one object is detected by the two cameras without calibrating parallax of the two selected images.

17. A method for detecting a distance to at least one object, the method comprising:
selecting two cameras of at least three cameras based on at least one condition; and
detecting the distance to the at least one object by using disparity of images captured by the two selected cameras, wherein optical systems of the three cameras are spaced apart at mutually different positions by distances which are greater than diameters of the optical systems, wherein a first distance between a first pair of two cameras of the three cameras, a second distance between a second pair of two cameras of the three cameras and a third distance between a third pair of two cameras of the three cameras are the same and wherein the distance to the at least one object is detected by the two cameras without calibrating parallax of the two selected images.

* * * * *